United States Patent
Horihata et al.

(10) Patent No.: US 8,710,807 B2
(45) Date of Patent: Apr. 29, 2014

(54) ELECTRIC ROTATING MACHINE FOR VEHICLE

(75) Inventors: Harumi Horihata, Nagoya (JP); Hideaki Nakayama, Tokoname (JP)

(73) Assignee: Denso Corporation, Kariya (JP)

( * ) Notice: Subject to any disclaimer, the term of this patent is extended or adjusted under 35 U.S.C. 154(b) by 403 days.

(21) Appl. No.: 13/277,459

(22) Filed: Oct. 20, 2011

(65) Prior Publication Data

US 2012/0098503 A1    Apr. 26, 2012

(30) Foreign Application Priority Data

Oct. 20, 2010 (JP) ................................. 2010-235616

(51) Int. Cl.
*H02P 9/00* (2006.01)

(52) U.S. Cl.
USPC ............................................. 322/33; 322/34

(58) Field of Classification Search
USPC .................................... 322/22, 23, 24, 33, 34
See application file for complete search history.

(56) References Cited

U.S. PATENT DOCUMENTS

| | | | |
|---|---|---|---|
| 5,543,703 A * | 8/1996 | Kusase et al. | 322/16 |
| 5,726,559 A | 3/1998 | Taniguchi et al. | |
| 5,731,689 A | 3/1998 | Sato | |
| 6,268,986 B1 | 7/2001 | Kobayashi et al. | |
| 7,098,628 B2 * | 8/2006 | Maehara et al. | 322/24 |
| 7,106,029 B2 * | 9/2006 | Inokuchi et al. | 322/28 |
| 7,183,749 B2 * | 2/2007 | Maehara | 322/22 |
| 8,541,988 B2 * | 9/2013 | Horihata et al. | 322/21 |
| 8,547,071 B2 * | 10/2013 | Horihata et al. | 322/21 |
| 8,570,004 B2 * | 10/2013 | Asada et al. | 322/45 |

FOREIGN PATENT DOCUMENTS

| | | |
|---|---|---|
| JP | A-08-140400 | 5/1996 |
| JP | A-08-336239 | 12/1996 |
| JP | A-09-019194 | 1/1997 |
| JP | A-2000-324893 | 11/2000 |

* cited by examiner

*Primary Examiner* — Nicholas Ponomarenko
(74) *Attorney, Agent, or Firm* — Oliff PLC

(57) ABSTRACT

A generator has a field coil of a rotor, an armature coil of a stator, a control device supplying an exciting current to the field coil when detecting rotation of the rotor, and a control circuit alternately setting an upper arm transistor and a lower arm transistor in on state in a rectifier module to generate a phase voltage. The control device detects the rotation from a periodic change in a sign of the difference between the phase voltage and a reference voltage. When the rectifier module is overheated, the control circuit sets the upper arm transistor in the off state and sets the lower arm transistor in the on state to almost fix the phase voltage, the control device detects no rotation and stops supplying the exciting current, and the rectifier module generates no phase voltage to decrease temperature of the rectifier module.

13 Claims, 14 Drawing Sheets

ELECTRIC ROTATING MACHINE FOR VEHICLE

CROSS-REFERENCE TO RELATED APPLICATION

This application is based upon and claims the benefit of priority of the prior Japanese Patent Application 2010-235616 field on Oct. 20, 2010, so that the contents of which are incorporated herein by reference.

BACKGROUND OF THE INVENTION

1. Field of the Invention

The present invention relates generally to an electric rotating machine mounted on a vehicle such as a passenger car or a truck, and more particularly to the electric rotating machine performing an operation for protecting each of rectifier modules disposed in the machine from overheating.

2. Description of Related Art

A control device for controlling an electric motor is well known (e.g., refer to Published Japanese Patent First Publication No. 2000-324893). This control device detects the temperature of a switching element formed in a semiconductor for electric power conversion by detecting the forward voltage of a diode of the switching element, and controls the switching element to be set in the off state when judging that the switching element is overheated.

Further, a control device for a synchronous power generator of a vehicle is well known (e.g., refer to Published Japanese Patent First Publication No. H09-19194). This control device detects the temperature of a field coil of the generator, and controls the field coil such that a field current is reduced when the detected temperature exceeds a predetermined value. Moreover, a control device for an alternator of a vehicle is well known (e.g., refer to Published Japanese Patent First Publication No. H08-336239). This control device detects the temperature of the alternator by detecting a field current of the alternator and controls the alternator such that the field current is reduced when the temperature of the alternator exceeds a predetermined threshold value. Furthermore, an automatic voltage adjusting device for an alternator is well known (e.g., refer to Published Japanese Patent First Publication No. H08-140400). This adjusting device uses a Zener diode having a function of temperature compensation, and the Zener diode produces a reference voltage depending on the temperature of the generator.

The prior art disclosed in the Publication No. 2000-324893 relates to the control of the electric motor. Therefore, this prior art cannot be applied for the control of a power generator used for a vehicle in which a current rectifying operation is performed by using switching elements formed of metal-oxide-semiconductor (MOS) transistors. More specifically, even when a control device controls a switching element formed of MOS transistors to be turned off, an electric current still flows through a parasitic diode formed around the transistors. Therefore, heat generated during the off state of the switching element becomes larger than heat generated during the on state of the switching element. This means that, even when the switching element is turned off to reduce heat excessively generated in the switching element, the control device cannot prevent the switching element from overheating caused by the parasitic diode.

In the prior art disclosed in the Publication No. H09-19194, the Publication No. H08-336239 and the Publication No. H08-140400, the field current is set based on the temperature of the field coil or the like. However, even when this setting method of the field current is used for a generator for a vehicle, the control device cannot prevent the rectifier from overheating. More specifically, although the detected temperature in the prior art disclosed in the above-described Publications generally relates with the temperature of the MOS transistors forming the rectifier, the detected temperature does not accurately indicate the temperature of the MOS transistors. Therefore, the control device cannot prevent the MOS transistors from overheating caused in the MOS transistors. Further, many MOS transistors are used for the rectifier of the generator for vehicle. Because functions of the MOS transistors in the rectifier are different from one another, it is impossible or very difficult to prevent the MOS transistors from being overheated, while considering different functions of the MOS transistors.

SUMMARY

Hence, it is desired to provide an electric rotating machine for a vehicle which reliably protects MOS transistors contained in a rectifier from overheating caused in the MOS transistors.

According to an exemplary embodiment, there is provided an electric rotating machine for a vehicle comprising a field coil of a rotor, an armature coil of a stator forming a multi-phase coil, a switching unit formed of a bridge circuit having a switching element of an upper arm and a switching element of a lower arm, a switching control unit, a generator control device, a temperature detecting unit, and an overheating protecting unit. The field coil magnetizes field magnetic poles of the rotor in response to an exciting current flowing through the field coil and generates a rotating magnetic field from both the rotation of the rotor and the magnetized field magnetic poles, the armature coil generates an alternating current voltage induced by the rotating magnetic field. The switching unit rectifies the alternating current voltage induced in the armature coil. The switching control unit controls each of the switching elements of the switching unit to be set in an on state or an off state. The generator control device controls the exciting current supplied to the field coil to control an output voltage of the switching unit, detects the rotation of the rotor from a phase voltage of the alternating current voltage of the armature coil, and stops or reduces the supply of the exciting current to the field coil when detecting no rotation of the rotor or a stop of the rotation of the rotor. The temperature detecting unit detects a temperature of the switching unit. The overheating protecting unit performs an overheating protecting operation, when detecting that the temperature of the switching unit detected by the temperature detecting unit indicates overheating of the switching unit, to set one of the switching elements of the upper and lower arms in the on state and sets the other switching element in the off state.

With this structure of the electric rotating machine, when the switching unit is set in the overheating state, the overheating protecting unit sets one of the switching elements of the upper and lower arms in the on state while setting the other switching element in the off state. Therefore, the phase voltage is fixed to a lower value or a higher value of the phase voltage. When electric power of the output voltage generated in the generator is accumulated in a battery, the voltage of the lower value is applied to the negative electrode terminal of the battery, and the voltage of the higher value is applied to the positive electrode terminal of the battery. Therefore, the generator control device detects no rotation of the rotor or a stop of the rotation of the rotor, and stops or reduces the supply of the exciting current to the field coil.

Accordingly, the overheating protecting unit can perform the overheating protecting operation for the switching unit so as to reliably protect the transistors of the switching unit from overheating caused in the switching unit. Further, the generator needs no connection line for notifying the occurrence of overheating to the generator control device, so that the wiring and structure of the generator can be simplified.

DETAILED DESCRIPTION OF THE PREFERRED EMBODIMENT

Figure 1:
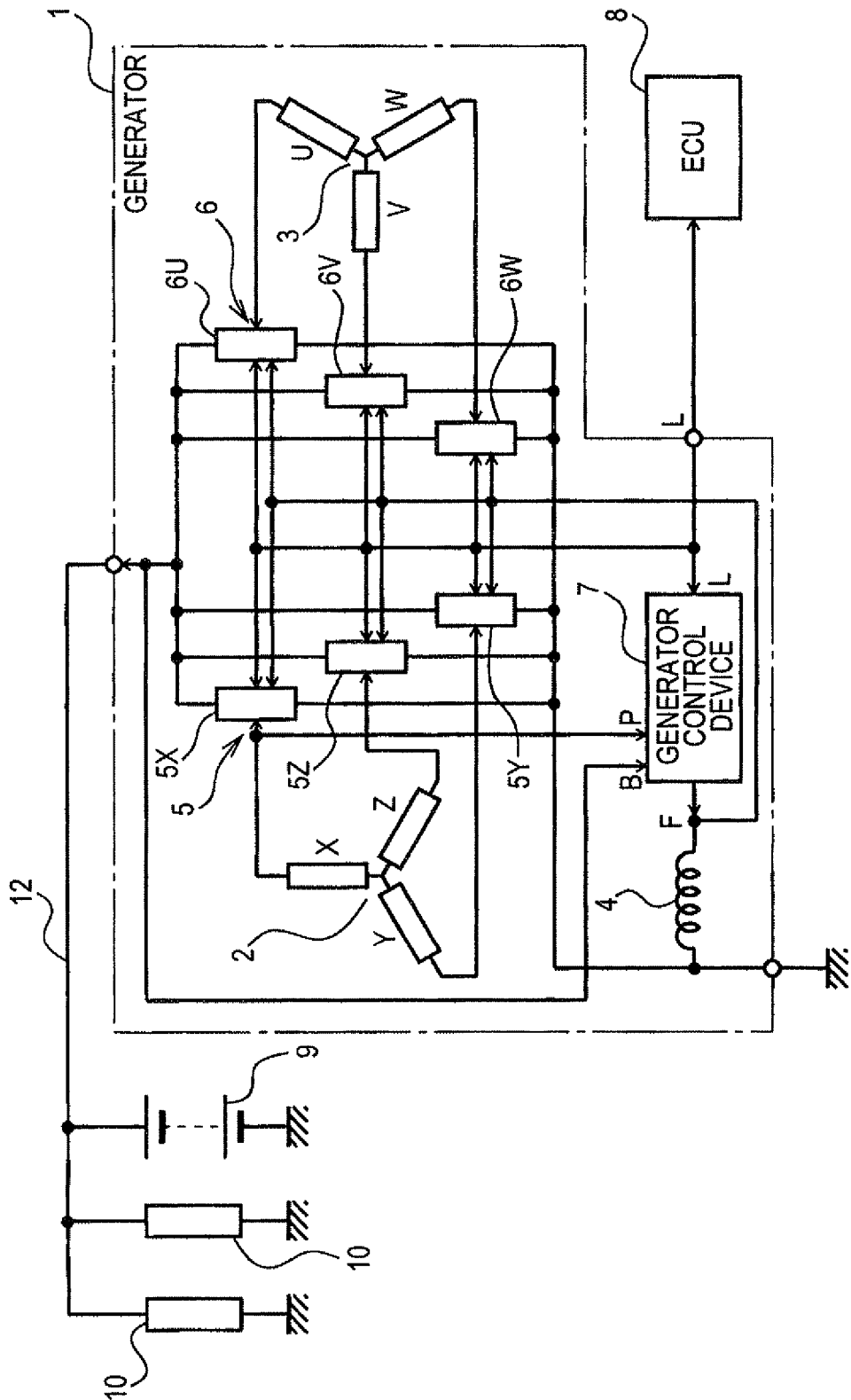
FIG. 1 is a view showing a structure of a generator for a vehicle according to an embodiment of the present invention.

The present invention will now be described with reference to the accompanying drawings, in which like reference numerals indicate like parts, members or elements throughout the specification unless otherwise indicated.

FIG. 1 is a view showing a structure of a generator for a vehicle according to an embodiment. As shown in FIG. 1, a generator 1 has two stator coils (i.e., armature coils) 2 and 3, a field coil 4, a rectifier module group 5 corresponding to the stator coil 2, a rectifier module group 6 corresponding to the stator coil 3, and a generator control device 7. The rectifier module groups 5 and 6 denote a switching unit.

The stator coil 2 is a multi-phase coil (e.g., a three-phase coil composed of an X phase coil, a Y phase coil and a Z phase coil). This coil 2 is wounded on a cylindrically-shaped stator core (not shown). The other stator coil 3 is a multi-phase coil (e.g., a three-phase coil composed of a U phase coil, a V phase coil and a W phase coil). This coil 3 is wounded on the stator core such that the position of the coil 3 is shifted from the position of the coil 2 by 30 degrees of electrical angle. A stator of the generator 1 is composed of the coils 2 and 3 and the stator core.

The field coil 4 is wound on field magnetic poles (not shown) so as to face the inner circumferential surface of the stator core. The coil 4 and the magnetic poles form a rotor of the generator 1. When an exciting current flows through the coil 4 while the rotor is rotated by an external force, the field magnetic poles are magnetized so as to form a rotating magnetic field, and the stator coils 2 and 3 generate or induce a three-phase alternating current (ac) voltage in each of the stator coils 2 and 3.

The rectifier module group 5 is connected with the stator coil 2, and the module group 5 and the coil 2 form a three-phase full wave rectifying circuit (i.e., a bridge circuit) so as to convert the ac voltage induced in the coil 2 into a direct current (dc) voltage. The module group 5 has rectifier modules 5X, 5Y and 5Z of which the number is equal to the number of phases of an alternating current induced in the coil 2. The module 5X is connected with an output terminal of the X phase coil of the coil 2, the module 5Y is connected with an output terminal of the Y phase coil of the coil 2, and the module 5Z is connected with an output terminal of the Z phase coil of the coil 2.

The rectifier module group 6 is connected with the stator coil 3, and the module group 6 and the coil 3 form another three-phase full wave rectifying circuit (i.e., another bridge circuit) so as to convert the ac voltage induced in the coil 3 into a dc voltage. The module group 6 has rectifier modules 6U, 6V and 6W of which the number is equal to the number of phases of an alternating current induced in the coil 3. The module 6U is connected with an output terminal of the U phase coil of the coil 3, the module 6V is connected with an output terminal of the V phase coil of the coil 3, and the module 6W is connected with an output terminal of the W phase coil of the coil 3.

The control device 7 is connected with the field coil 4 through an F terminal and acts as an excitation control circuit for controlling an exciting current flowing through the coil 4. The device 7 controls the exciting current such that an output voltage $V_B$ of the generator 1 is regulated to a regulated voltage value Vreg. The voltage $V_B$ denotes the sum of phase voltages of all rectifier modules 5X to 5Z and 6U to 6W. For example, when detecting that the voltage $V_B$ becomes higher than the voltage value Vreg, the device 7 stops supplying the exciting current to the coil 4. In contrast, when detecting that the voltage $V_B$ becomes lower than the voltage value Vreg, the device 7 starts supplying the exciting current to the coil 4. Therefore, the device 7 controls the exciting current so as to regulate the voltage $V_B$ to the voltage value Vreg. Further, the device 7 detects an engine speed of the generator 1 (or the number of revolutions in the rotor) from one (e.g., the X phase voltage) of the phase voltages of the stator coils 2 and 3, and stops or reduces the supply of the exciting current to the field coil 4 when detecting the stop of the rotation of the rotor (i.e., the number of revolutions in the rotor substantially equal to zero) or no rotation of the rotor. Moreover, the control device 7 is connected with an electronic control unit (ECU) 8, acting as an external control device, through a communication terminal L and a signal line of the serial communication to perform a two-way serial communication (e.g., a local interconnect network (LIN) communication using a LIN protocol) with the ECU 8 and to receive and send communication messages from/to the ECU 8.

Figure 2:
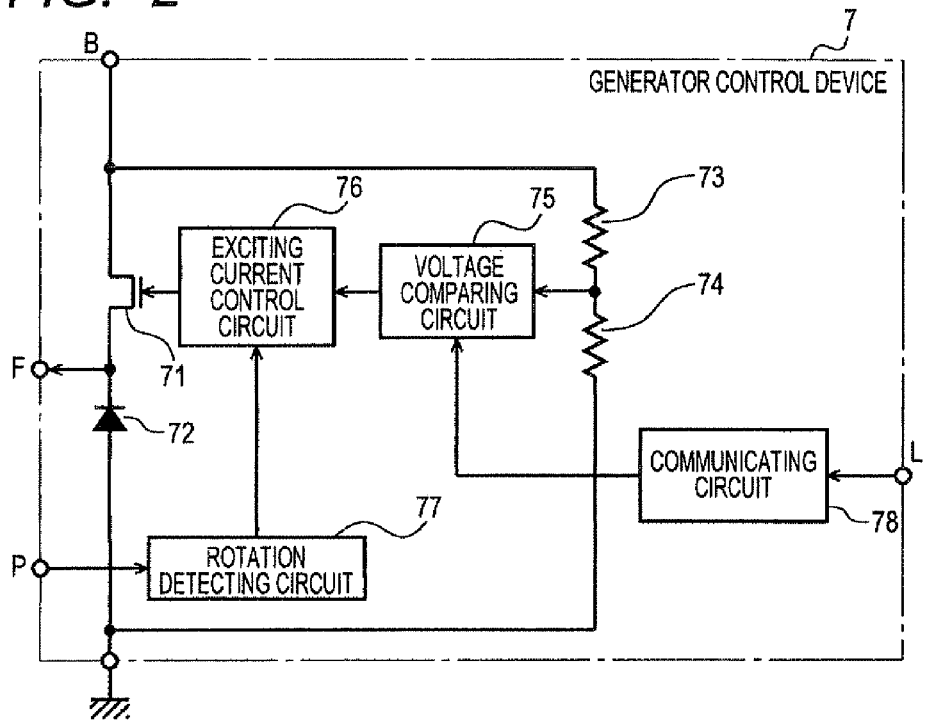
FIG. 2 is a view showing a structure of a control device of the generator shown in FIG. 1.

FIG. 2 is a view showing a structure of the control device 7 in detail. As shown in FIG. 2, the control device 7 has a MOS transistor 71, a circulating current diode 72, resistors 73 and 74, a voltage comparing circuit 75, an exciting current control circuit 76, a rotation detecting circuit 77, and a communicating circuit 78.

The communicating circuit 78 performs the serial communication with the ECU 8. Therefore, the control device 7 can receive data of the regulated voltage Vreg and the like sent from the ECU 8.

The resistors 73 and 74 form a voltage dividing circuit which produces a divided voltage obtained by dividing the output voltage $V_B$ generated in the generator 1 and applies the divided voltage to the comparing circuit 75. The circuit 75 receives the regulated voltage Vreg from the circuit 78 and compares the divided voltage with a reference voltage corresponding to the regulated voltage Vreg. For example, when the compared result indicates that the divided voltage is equal to or lower than the reference voltage, the circuit 75 outputs a signal set at the high level (hereinafter, called a high-level signal). In contrast, when the divided voltage is higher than the reference voltage, the circuit 75 outputs a signal set at the low level (hereinafter, called a low-level signal).

The control circuit 76 produces a pulse width modulation (PWM) signal having a driving duty ratio determined based on the compared result of the comparing circuit 75, applies the PWM signal to the gate of the MOS transistor 71, and controls the MOS transistor 71 to be turned on and off. To suppress a rapid change in an output current of the generator 1, the control circuit 76 may perform a gradual exciting control or the like to gradually change the exciting current.

The detecting circuit 77 is, for example, connected with the X phase coil of the stator coil 2 through a P terminal to detect the X phase voltage Vp periodically changing with time at the end of the X phase coil. The X phase voltage Vp is changed with time every repetition period corresponding to the cycle of the phase voltage Vp. The circuit 77 detects a periodic change in the result of comparison (i.e., a large and small relation) between the X phase voltage Vp and a reference voltage Vref preset for rotation detection (in other words, a periodic change in the plus or minus sign of the difference between the voltage Vp and the reference voltage Vref) to detect whether or not the rotor is rotating. During the normal operation in which no short-circuit failure occurs in any of the rectifier module 5X and the coil 2, the X phase voltage Vp having a predetermined amplitude is applied to the P terminal during the electric power generation. The reference voltage Vref is set such that the X phase voltage Vp periodically exceeds the reference voltage Vref and becomes lower than the reference voltage Vref. Therefore, the detecting circuit 77 detects a periodic change in the sign of the difference between the voltage Vp and the reference voltage Vref. When detecting the periodic change, the detecting circuit 77 judges that the rotation of the rotor is detected. Accordingly, the circuit 77 can reliably detect the rotation of the rotor during the normal operation period. In contrast, when detecting no periodic change, the detecting circuit 77 judges that no rotation of the rotor is detected.

The control circuit 76 receives the rotation detecting result of the circuit 77. During the rotation of the rotor, the circuit 76 outputs a first PWM signal to the transistor 71 to supply the exciting current to the field coil 4 through the transistor 71. The circuit 76 sets the duty ratio of the first PWM signal so as to set the exciting current at a required level of the power generation. In contrast, when the circuit 77 detects substantially no rotation of the rotor or detect the stop of the rotation of the rotor, the circuit 76 outputs a second PWM signal to stop or reduce the supply of the exciting current. The circuit 76 sets the duty ratio of the second PWM signal at zero or a value near to zero so as to stop or reduce the power generation.

Next, the rectifier module 5X representing the modules is now described with reference to FIG. 3.

Figure 3:
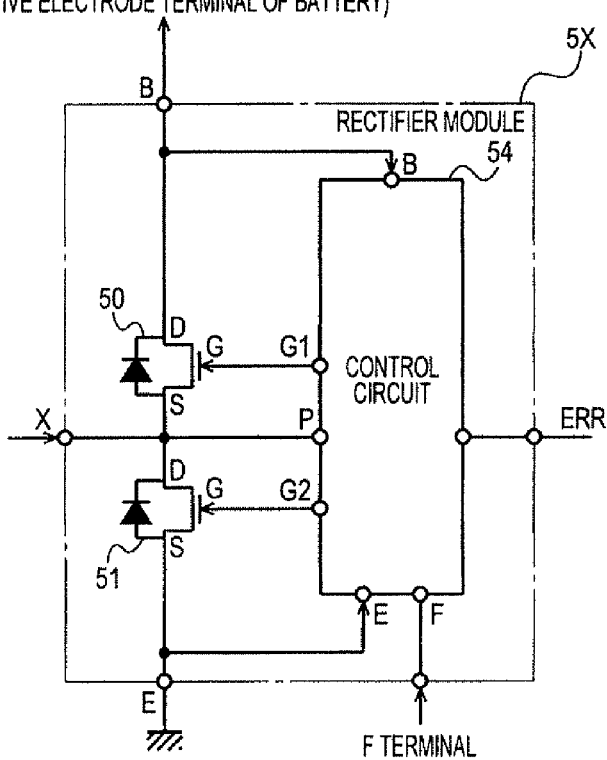
FIG. 3 is a view showing a structure of a rectifier module of the generator shown in FIG. 1.

FIG. 3 is a view showing a structure of the rectifier module 5X. The other rectifier modules 5Y, 5Z, 6U, 6V and 6W have the same structure and function as the structure and function of the module 5X. As shown in FIG. 3, the module 5X has a MOS transistor 50 of the upper arm (or a high voltage side), a MOS transistor 51 of the lower arm (or a low voltage side) and a control circuit 54 (i.e., a switching control unit). The source of the transistor 50 is connected with the X phase coil of the stator coil 2, while the drain of the transistor 50 is connected with the positive electrode terminal of a battery 9 and current consumers 10 through a charging line 12 (see FIG. 1). The transistor 50 forms a switching element of the upper arm. The drain of the transistor 51 is connected with the X phase coil of the stator coil 2, while the source of the transistor 51 is earthed so as to be electrically connected with the negative electrode terminal of the battery 9. The transistor 51 forms a switching element of the lower arm. Therefore, a serial circuit formed of the transistors 50 and 51 is disposed between the positive and negative electrode terminals of the battery 9, and the X phase coil is connected with the connecting point of the transistors 50 and 51. Further, a diode is connected with the source and drain of each of the transistors 50 and 51 in parallel to the transistor. This diode is formed of a parasitic diode (i.e., a body diode) of the corresponding transistor. However, a real diode may be connected with each transistor in parallel to each other as an additional component. Moreover, at least one of the upper and lower arms may be formed of switching elements different from MOS transistors.

Figure 4:
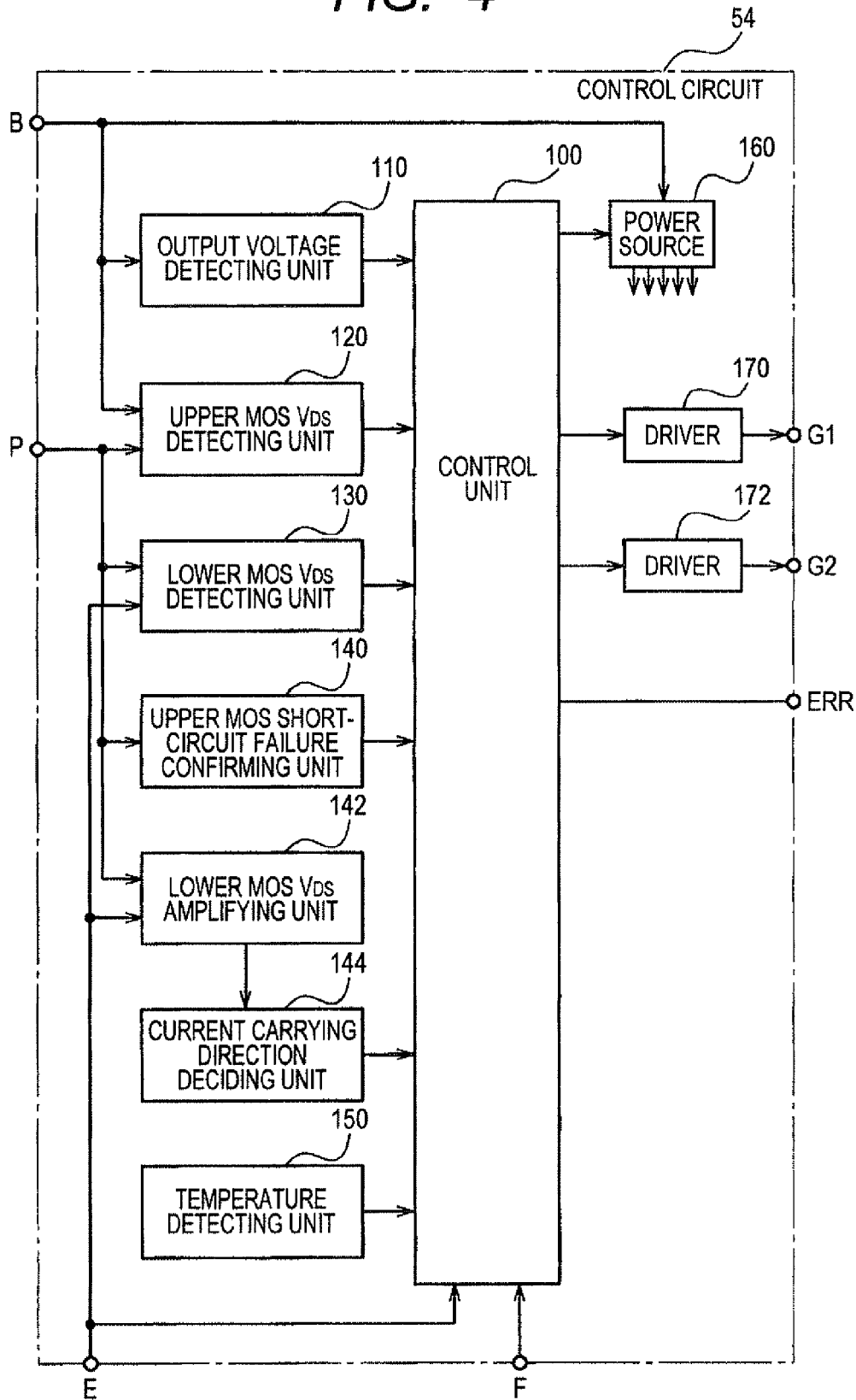
FIG. 4 is a block diagram of a control circuit of the rectifier module shown in FIG. 3.

FIG. 4 is a block diagram of the control circuit 54. As shown in FIG. 4, the control circuit 54 of the rectifier module 5X has a control unit 100, a power source 160, an output voltage detecting unit 110, an upper MOS $V_{DS}$ detecting unit 120, a lower MOS $V_{DS}$ detecting unit 130, an upper MOS short-circuit failure confirming unit 140 (i.e., a short-circuit failure confirming unit), a lower MOS $V_{DS}$ amplifying unit 142, a current carrying direction deciding unit 144, a temperature detecting unit 150, and drivers 170 and 172.

The operation of the power source 160 is started at a timing at which the exciting current is supplied from the control device 7 to the field coil 4. The source 160 applies an operating voltage to each component of the circuit 54. The power source 160 stops applying the operating voltage at a timing at which the supply of the exciting current is stopped. The start and stop of the power supply from the source 160 are performed in response to an instruction sent from the control unit 100.

An output terminal G1 of the driver 170 is connected with the gate G of the transistor 50 of the upper arm, and the driver 170 produces a driving signal to repeatedly turn on and off the transistor 50. In the same manner, an output terminal G2 of the driver 172 is connected with the gate G of the transistor 51 of the lower arm, and the driver 172 produces a driving signal to repeatedly turn on and off the transistor 51.

The detecting unit 110 is, for example, composed of a differential amplifier and an analog to digital converter for converting the output of this amplifier into digital data. The unit 110 outputs data indicating the voltage of a B terminal (i.e., an output terminal) of the generator 1 (or the module 5X). The analog to digital converter may be disposed in the control unit 100.

Figure 5:
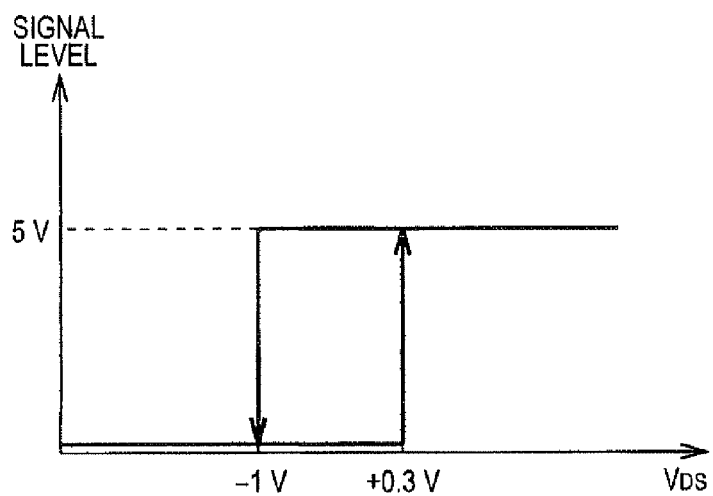
FIG. 5 shows a signal level of an upper MOS $V_{DS}$ detecting unit shown in FIG. 8.

The detecting unit 120 detects a voltage $V_{DS}$ denoting an electric potential difference between the drain and source of the transistor 50 of the upper arm, compares the detected voltage $V_{DS}$ with a predetermined threshold value, and outputs a signal indicating the large and small relation (i.e., a result in comparison) between the voltage $V_{DS}$ and the threshold value. FIG. 5 shows a signal level of the detecting unit 120. In FIG. 5, the detected voltage $V_{DS}$ obtained by subtracting the electric potential at the drain from the electric potential of the source is indicated by the x axis, and the voltage level of the signal outputted from the detecting unit 120 is indicated by the Y axis. As shown in FIG. 5, when the phase voltage Vp of the X phase coil at the source of the transistor 50 becomes higher than the output voltage $V_B$ by 0.3V or more, the voltage $V_{DS}$ becomes equal to or higher than 0.3V. At this time, the output signal of the detecting unit 120 is changed from the low level (e.g., 0V) to the high level (e.g., 5V). Thereafter, when the phase voltage Vp becomes lower than the output voltage $V_B$ by 1.0V or more, the voltage $V_{DS}$ becomes equal to or lower than −1.0V. At this time, the output signal of the detecting unit 120 is changed from the high level to the low level.

The value higher than the output voltage $V_B$ by 0.3V is defined as a first upper threshold value V10 (refer to FIG. 9) relating to the transistor 50, and this value V10 corresponds to the signal of the detecting unit 120 changed to the high level. This threshold value V10 is used to reliably detect a start time of a diode current carrying period in which an electric current flows through the diode corresponding to the transistor 50. The threshold value V10 is set so as to be higher than a value which is obtained by adding the voltage $V_{DS}$ of the transistor 50, set in the on state, to the output voltage $V_B$ and to be lower than a value which is obtained by adding a forward voltage VF of the diode, corresponding to the transistor 50, to the output voltage $V_B$.

Further, the value lower than the output voltage $V_B$ by 1.0V is defined as a second upper threshold value V20 (refer to FIG. 9) relating to the transistor 50, and this value V20 corresponds to the signal of the detecting unit 120 changed to the low level. This threshold value V20 is used to reliably detect an end time of the diode current carrying period of the diode corresponding to the transistor 50. Therefore, the threshold value V20 is set so as to be lower than the output voltage $V_B$. A period of time, from a time at which the increasing phase voltage Vp reaches the first threshold value V10, to a time at which the decreasing phase voltage Vp reaches the second threshold value V20, is set as an on state period (hereinafter, called an upper arm on period) of the upper arm. Although the start time and the end time of this upper arm on period are shifted from the end time and the start time of a diode current carrying period in which electric current actually flows through the diode corresponding to the transistor 50 during the off state of the transistor 50, the control unit 100 performs a synchronous rectifying control on the basis of the upper arm on period.

Figure 6:
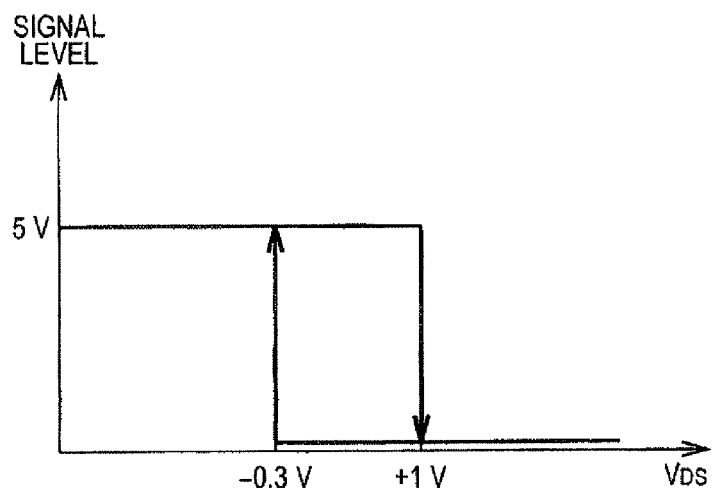
FIG. 6 shows a signal level of a lower MOS $V_{DS}$ detecting unit shown in FIG. 8.

The detecting unit 130 detects a voltage $V_{DS}$ denoting an electric potential difference between the drain and source of the transistor 51 of the lower arm, compares the detected voltage $V_{DS}$ of the transistor 51 with a predetermined threshold value, and outputs a signal indicating the large and small relation between the voltage $V_{DS}$ and the threshold value. FIG. 6 shows a signal level of the detecting unit 130. In FIG. 6, the detected voltage $V_{DS}$ obtained by subtracting the ground voltage $V_{GND}$ of the ground terminal (i.e., the negative electrode terminal) of the battery 9, substantially connected with the source of the transistor 51, from the phase voltage Vp of the X phase coil at the drain of the transistor 51 is indicated by the x axis, and the voltage level of the signal outputted from the detecting unit 130 is indicated by the Y axis. As shown in FIG. 6, when the phase voltage Vp (denoting the voltage of the drain of the transistor 51) of the X phase coil becomes lower than the ground voltage $V_{GND}$ by 0.3V or more, the voltage $V_{DS}$ becomes equal to or lower than −0.3V. At this time, the output signal of the detecting unit 130 is changed from the low level (0V) to the high level (5V). Thereafter, when the phase voltage Vp becomes higher than the ground voltage $V_{GND}$ by 1.0V or more, the voltage $V_{DS}$ becomes equal to or higher than 1.0V. At this time, the output signal of the detecting unit 130 is changed from the high level to the low level.

The value lower than the ground voltage $V_{GND}$ by 0.3V is defined as a first lower threshold value V11 (refer to FIG. 9), and this value V11 corresponds to the signal of the detecting unit 130 changed to the high level. This threshold value V11 of the transistor 51 is used to reliably detect a start time of a diode current carrying period of the diode corresponding to the transistor 51. The threshold value V11 is set so as to be lower than a value which is obtained by subtracting the voltage $V_{DS}$ of the transistor 51, set in the on state, from the ground voltage $V_{GND}$ and to be higher than a value which is obtained by subtracting a forward voltage VF of the diode, corresponding to the transistor 51, from the ground voltage $V_{GND}$.

Further, the value higher than the ground voltage $V_{GND}$ by 1.0V is defined as a second lower threshold value V21 (refer to FIG. 9), and this value V21 corresponds to the signal of the detecting unit 130 changed to the low level. This threshold value V21 of the transistor 51 is used to reliably detect an end time of the diode current carrying period of the diode corresponding to the transistor 51. Therefore, the threshold value V21 is set so as to be higher than the ground voltage $V_{GND}$. A period of time from a time, at which the decreasing phase voltage Vp reaches the first threshold value V11, to a time, at which the increasing phase voltage Vp reaches the second threshold value V21, is set as an on state period of the lower arm (hereinafter, called a lower arm on period). Although the start time and the end time of this lower arm on period are shifted from the end time and the start time of a diode current carrying period in which electric current actually flows through the diode corresponding to the transistor 51 during the off state of the transistor 51, the control unit 100 performs the synchronous rectifying control on the basis of the lower arm on period.

The temperature detecting unit 150 detects a temperature of the transistors 50 and 51 on the basis of forward voltages of the diodes located near the transistors 50 and 51. When judging that the detected temperature is high, the detecting unit 150 outputs a high-level signal. In contrast, when the detected temperature is low, the detecting unit 150 outputs a low-level signal. The detecting unit 150 may be disposed in the control unit 100.

Figure 7:
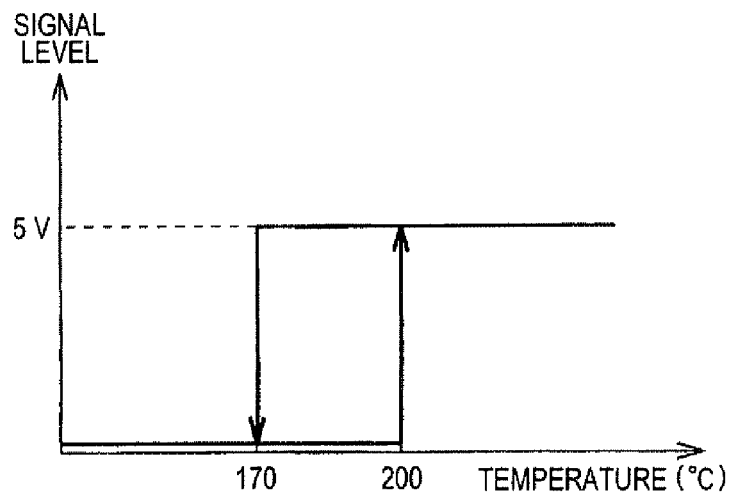
FIG. 7 shows a signal level of a temperature detecting unit shown in FIG. 8.

FIG. 7 shows a signal level of the detecting unit 150. In FIG. 7, temperature is indicated by the X-axis. The voltage level of the signal outputted from the detecting unit 150 is indicated by the Y-axis. As shown in FIG. 7, when the temperature detected by the detecting unit 150 is increased to 200 degrees C. (° C.) or more, the signal outputted from the unit 150 is changed from the low level (0V) to the high level (5V). Thereafter, when the temperature is decreased to 170° C. or less, the signal is changed from the high level (5V) to the low level (0V).

The confirming unit 140 judges or confirms whether or not a short-circuit failure has occurred between the drain and source of the transistor 50 of the upper arm. This short-circuit failure contains a failure occurring in the transistor 50 itself. Further, this short-circuit failure contains a failure which occurs in the driver 170 so as to always set the transistor 50 in the on state. When no failure occurs in either the driver 170 or the transistor 50, the phase voltage Vp is periodically changed between the output voltage $V_B$ and the ground voltage $V_{GND}$. In contrast, when the drain and source of the transistor 50 are always short-circuited, the phase voltage Vp is always fixed at a value near the output voltage $V_B$. When detecting the phase voltage Vp periodically changed, the confirming unit 140 confirms that no short-circuit failure occurs between the drain and source of the transistor 50 and outputs a low-level signal. In contrast, when confirming that a short-circuit failure has occurred between the drain and source of the transistor 50, the confirming unit 140 outputs a high-level signal.

The amplifying unit 142 amplifies the voltage $V_{DS}$ between the drain and source of the transistor 51 set in the on state. The deciding unit 144 compares the voltage $V_{DS}$ amplified by the unit 142 with a predetermined threshold value and decides a current carrying direction of the current flowing through the transistor 51 by using the comparison result.

The control unit 100 decides a start timing of an operation for a synchronous rectifying control and an end timing of the synchronous rectifying operation, sets an on timing and an off timing of each of the transistors 50 and 51 to perform the synchronous rectifying operation, and instructs the drivers 170 and 172 to start the driving operation of each of the transistors 50 and 51 at the on timing of the corresponding transistor and to end the driving operation of each of the transistors 50 and 51 at the off timing of the corresponding transistor. Further, the control unit 100 decides a timing at which the rectifying module 5X is transferred to a load dump protecting operation in which the rectifying module 5X is protected from load dump occurred in the rectifying module 5X, decides a timing at which the rectifying module 5X is transferred to an overheating protecting operation in which the rectifying module 5X is protected from overheating occurred in the rectifying module 5X, and transfers the rectifying module 5X to the state of the load dump protecting operation or the state of the overheating protecting operation at the corresponding decided timing.

Figure 8:
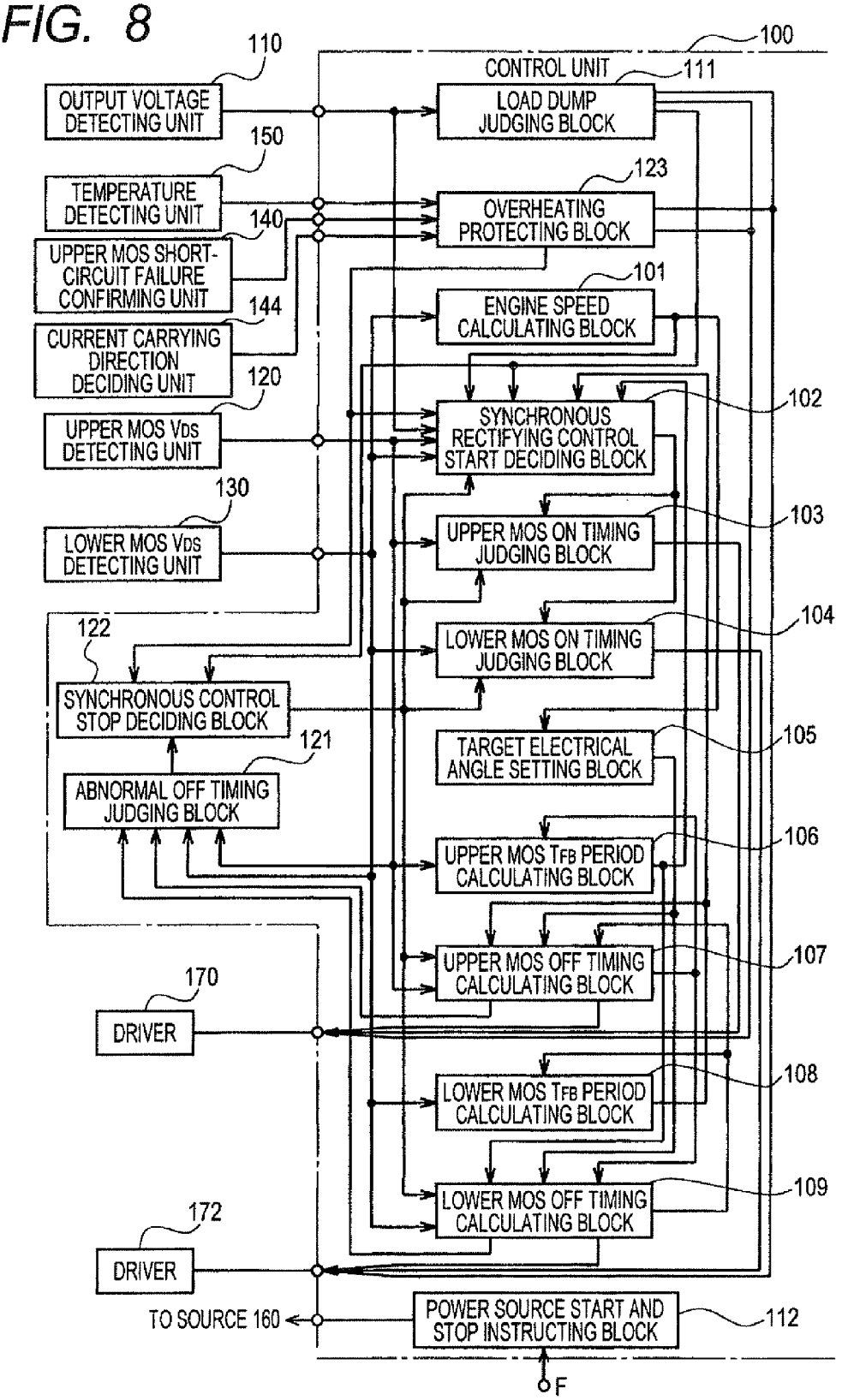
FIG. 8 is a block diagram of a control unit of the control circuit shown in FIG. 4.

FIG. 8 is a block diagram of the control unit 100. As shown in FIG. 8, the control unit 100 has an engine speed calculating block 101, a synchronous rectifying control start deciding block 102, an upper MOS on timing judging block 103, a lower MOS on timing judging block 104, a target electrical angle setting block 105, an upper MOS $T_{FB}$ period calculating block 106, an upper MOS off timing calculating block 107, a lower MOS $T_{FB}$ period calculating block 108, a lower MOS off timing calculating block 109, and a power source start and stop instructing block 112. A central processing unit (CPU) performs functions of these blocks while executing predetermined computer programs stored in a memory or the like. However, a hardware component may be operated to perform the function of each block.

With this structure of the rectifying module 5X, an operation of this module 5X is now described.

(1) Judgment on Starting and Stopping Power Source

The instructing block 112 always monitors an exciting current flowing the coil 4 through the F terminal of the control device 7. The exciting current is supplied to the field coil 4 in response to a PWM signal supplied to the gate of the transistor 71. When detecting that the control device 7 continues outputting the exciting current for 30 μs ($3 \times 10^{-5}$ s) in response to the 30 μs continuation of the PWM signal, the instructing block 112 instructs the power source 160 to start outputting electric power to the components of the control circuit 54. In, contrast, when detecting that no exciting current is outputted for one second in response to the 1 s continuation of no outputting of any PWM signal, the instructing block 112 instructs the power source 160 to stop outputting electric power. Alternatively, the instructing block 112 monitors the output voltage $V_B$ of the generator 1. When detecting that the output voltage $V_B$ becomes lower than a reference voltage (e.g., 5V), the instructing block 112 judges that a failure based on low output voltage has occurred, and instructs the power source 160 to stop outputting electric power. Therefore, the operation of the module 5X starts when the control device 7 starts supplying the exciting current to the field coil 4, and the operation of the module 5X is stopped when the supply of the exciting current is stopped. Accordingly, the modules 5X to 5Y and 6U to 6W can be operated only during the power generation of the generator 1, so that electric power consumed wastefully can be suppressed.

(2) Synchronous Rectifying Control

A synchronous rectifying control (hereinafter, called a synchronous control) performed by the control unit 100 is now described.

Figure 9:
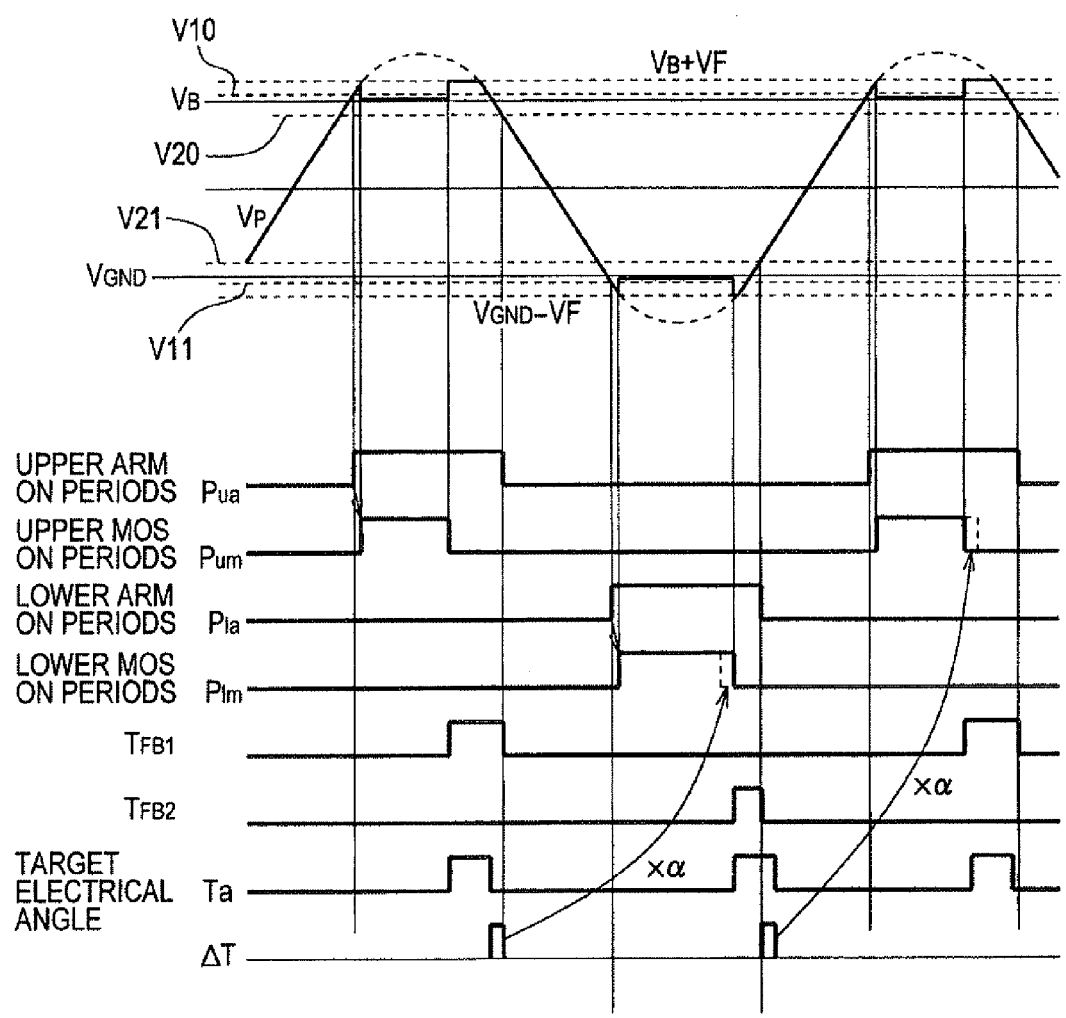
FIG. 9 is a timing chart of on periods in a synchronous control of the control unit shown in FIG. 8.

FIG. 9 is a timing chart of on periods in a synchronous control. In FIG. 9, each of upper arm on periods Pua indicates a period of time in which the output signal of the detecting unit 120 is set in the high level. A start time and an end time of each of upper MOS on periods Pum indicates an on timing and an off timing of the transistor 50 of the upper arm, respectively. Each of lower arm on periods Pla indicates a period of time in which the output signal of the detecting unit 130 is set in the high level. A start time and an end time of each of lower MOS on periods Plm indicates an on timing and an off timing of the transistor 51 of the lower arm, respectively.

As shown in FIG. 8 and FIG. 9, the judging block 103 monitors the output signal of the detecting unit 120 depending on the drain-source voltage $V_{DS}$ of the transistor 50. This output signal indicates upper arm on periods Pua. When detecting one leading edge at which this output signal is changed from the low level to the high level, the judging block 103 judges that the time of this leading edge is an on timing of the transistor 50 and sends an instruction to the driver 170. In response to this instruction, the driver 170 turns on the transistor 50.

The calculating block 107 calculates a time elapsed by a predetermined period after the turning on of the transistor 50, determines this calculated time as an off timing of the transistor 50, and sends an instruction indicating this off timing to the driver 170. In response to this instruction, the driver 170 turns off the transistor 50 at the off timing. The predetermined period used to determine the off timing of the transistor 50 in the block 107 is changeably set such that the off timing is earlier than the end time of the corresponding upper arm on period Pua by a target electrical angle Ta. The end time of the upper arm on period Pua is equal to a time of the trailing edge at which the output signal of the detecting unit 120 is changed from the high level to the low level.

When a diode rectification, in which electric current flows through the diode corresponding to the transistor 50 without flowing through the transistor 50 always set in the off state, is performed, the angle Ta acts as a margin for preventing the off timing of the transistor 50 from being later than the end time of the diode current carrying period for the diode rectification. The setting block 105 sets the angle Ta depending on the engine speed calculated by the calculating block 101. This target electrical angle Ta may be set at a constant value, regardless of the engine speed. However, it is preferred that the angle Ta be set at a high value when the engine speed is low or high so as to place the engine 1 in a low speed region or a high speed region, while being set at a low value when the engine speed is placed in an intermediate region between the low speed region and the high speed region.

The calculating block 101 calculates the engine speed by using a cycle of leading edges or a cycle of trailing edges of the signal outputted from the detecting unit 130. The output signal of the detecting unit 130 depends on the drain-source voltage $V_{DS}$ of the transistor 51. Because the engine speed is calculated by using the output signal of the detecting unit 130, the engine speed can be stably detected, regardless of a change in the output voltage $V_B$ of the generator 1.

In the same manner, the judging block 104 monitors the output signal of the detecting unit 130 depending on the drain-source voltage $V_{DS}$ of the transistor 51. This output signal indicates lower arm on periods Pla. When detecting one leading edge at which this output signal is changed from the low level to the high level, the judging block 104 judges that a time of this leading edge is an on timing of the transistor 51 and sends an instruction to the driver 172. In response to this instruction, the driver 172 turns on the transistor 51.

The calculating block 109 calculates a time elapsed by a predetermined period after the turning-on of the transistor 51, determines this calculated time as an off timing of the transistor 51, and sends an instruction indicating this off timing to the driver 172. In response to this instruction, the driver 172 turns off the transistor 51 at the off timing of the transistor 51. The predetermined period used to calculate this off timing in the block 109 is changeably set such that the off timing is earlier than the end time of the corresponding lower arm on period Pla by a target electrical angle Ta. The end time of the lower arm on period Pla is equal to a time of the trailing edge at which the output signal of the detecting unit 130 is changed from the high level to the low level.

When a diode rectification, in which electric current flows through the diode corresponding to the transistor 51 without flowing through the transistor 51 always set in the off state, is performed, the angle Ta acts as a margin for preventing the off timing of the transistor 51 from being later than the end time of the diode current carrying period for the diode rectification. The setting block 105 sets this angle Ta depending on the engine speed calculated by the calculating block 101.

In the actual operation, at the time the transistor 50 or 51 is turned off, the control unit 100 cannot know the end time of the corresponding upper or lower arm on period Pua or Pla. Therefore, the calculating blocks 107 and 109 use the end times of the upper and lower arm on periods Pua and Pla, already ended before a half of the repetition period (denoting the period corresponding to one cycle in electrical angle) of the X phase voltage Vp, as the end times of the upper and lower arm on periods Pua and Pla in the present repetition period of the X phase voltage Vp. Therefore, the precision in the setting of both the off timing of the transistor 50 and the off timing of the transistor 51 can be heightened.

For example, the off timing of the transistor 50 of the upper arm is set as follows. The calculating block 108 calculates a period (indicated by electrical angle) $T_{FB2}$ from the off timing of the transistor 51 of the lower arm, already ended before the half repetition period, to the end time of the lower arm on period Pla. The calculating block 107 calculates a period difference ΔT by subtracting the target electrical angle Ta from the period $T_{FB2}$. When the engine speed is stable, the period $T_{FB2}$ becomes equal to the angle Ta, and ΔT=0 is satisfied. However, the engine speed is often changed by the acceleration and deceleration of the vehicle, pulsation in the rotation of the rotor, a change in electric power consumed by the current consumers 10, a change of the clock cycle in the operation of the control unit 100 embodied by the execution of computer programs, a turning-off delay from the outputting of the off instruction to the driver 170 or 172 to the actual turning-off of the transistor 50 or 51, and the like. Therefore, the period difference ΔT often differs from zero.

In this embodiment, the calculating block 107 corrects the lower MOS on period Plm, used in the calculating block 109 before the half repetition period, on the basis of the difference ΔT and sets the upper MOS on period Pum, by using the corrected period Plm, to determine the off timing of the transistor 50. More specifically, the calculating block 107 determines a correction factor α (>0) and sets the period Pum according to a following equation.

(upper MOS on period Pum)=(lower MOS on period Plm before half repetition period)+ΔT×α

In the example shown in FIG. 9, one first period Pum, one period Plm and one second period Pum later than the first period Pum by one repetition period are set in that order. When the second period Pum is set by using the period Plm and the difference ΔT, this difference ΔT becomes negative. Therefore, the second period Pum becomes shorter than the period Plm.

In the same manner, the off timing of the transistor 51 of the lower arm is set as follows. The calculating block 106 calculates a period (indicated by electrical angle) $T_{FB1}$ from the off timing of the transistor 50 of the upper arm, already ended before the half repetition period, to the end time of the upper arm on period Pua. The calculating block 109 calculates a period difference ΔT by subtracting the target electrical angle Ta from the period $T_{FB1}$. The calculating block 109 corrects the upper MOS on period Pum, used in the calculating block 107 before the half repetition period, on the basis of the difference ΔT and sets the lower MOS on period Plm, by using the corrected period Pum, to determine the off timing of the transistor 51. More specifically, the calculating block 109 determines the correction factor α and sets the period Plm according to a following equation.

(lower MOS on period Plm)=(upper MOS on period Pum before half repetition period)+ΔT×α

In the example shown in FIG. 9, when the period Plm succeeding the first period Pum is set by using the first period Pum and the difference ΔT, this difference ΔT becomes positive. Therefore, the period Plm becomes longer than the first period Pum.

As described above, the transistor 50 of the upper arm and the transistor 51 of the lower arm are alternately set in the on state in the same changing cycle as the changing cycle in the diode rectification. Accordingly, the switching operation for the synchronous control can be performed in the generator 1 at a low loss of electric power generated in the generator 1 while using MOS transistors of the rectifier modules 5X, 5Y, 5Z, 6U, 6V and 6W represented by the transistors 50 and 51.

(3) Judgment on a Start of the Synchronous Control

Next, the decision on a start of the synchronous control is now described. Just after a start of the operation of the rectifier modules represented by the rectifier module 5X or after the stop of the synchronous control caused by the occurrence of a failure or a malfunction in the generator 1, the operation of the generator 1 based on the synchronous control is started when predetermined conditions for a start of the synchronous control are satisfied. The deciding block 102 judges whether or not conditions for a start of the synchronous control are satisfied. When judging that the conditions are satisfied, the deciding block 102 decide a start of the synchronous control, sends a notice, indicating a start of the synchronous control, to the judging blocks 103 and 104. Thereafter, the synchronous control described above is performed, and the transistors 50 and 51 representing MOS transistors of the rectifier modules 5X, 5Y, 5Z, 6U, 6V and 6W are alternately set in the on state.

Conditions for a start of the synchronous control are as follows.

(C1) First start condition: The number of upper arm on periods Pua and lower arm on periods Pla (see FIG. 9) successively appearing in one phase voltage represented by the X phase voltage Vp reaches thirty-two. When the rotor has eight magnetic poles, this number of successively appearing times denotes two rotations of the rotor expressed by mechanical angle. The number of successively appearing times may be 16 corresponding to one rotation, a value corresponding to three rotations or more, or a value corresponding to rotations of which the number is different from any integral number.

(C2) Second start condition: The output voltage $V_B$ is within a normal range higher than 7V and lower than 18V. This range corresponds to a vehicle system using the voltage of 12V. However, the lower limit of 7V or the higher limit of 18V may be appropriately changed. In the case where the generator 1 is used for a vehicle system using the voltage of 24V or the like, it is required to change the lower and higher limits to ones matching with the generated voltage used in the vehicle system.

(C3) Third start condition: None of MOS transistors of the rectifier modules 5X, 5Y, 5Z, 6U, 6V and 6W represented by the transistors 50 and 51 are set in the overheating state.

(C4) Fourth start condition: None of MOS transistors of the rectifier modules 5X, 5Y, 5Z, 6U, 6V and 6W represented by the transistors 50 and 51 are operated for the load dump protection.

(C5) Fifth start condition: A change or fluctuation in the output voltage $V_B$ is smaller than 0.5V/200 μs. When the synchronous control is started, the allowable value of this change depends on the components of the generator 1 or computer programs. Therefore, the allowable value used for the decision on a start of the synchronous control may be appropriately changed on the basis of the components or the like.

(C6) Sixth start condition: The periods $T_{FB1}$ and $T_{FB2}$ are longer than 15 μs together. The relation between the lower limit of the periods $T_{FB1}$ and $T_{FB2}$ and the occurrence of a failure or malfunction depends on the cause of the failure or malfunction. Therefore, the lower limit of 15 μs may be appropriately changed on the basis of the cause of a failure or malfunction. Further, in this embodiment, the calculation of the periods $T_{FB1}$ and $T_{FB2}$ in the calculating block 106 and 108 during the synchronous control is described above. However, before a start of the synchronous control, the periods $T_{FB1}$ and $T_{FB2}$ are also calculated in the calculating block 106 and 108 such that the deciding block 102 decides a start of the synchronous control by using the periods $T_{FB1}$ and $T_{FB2}$.

Figure 10:
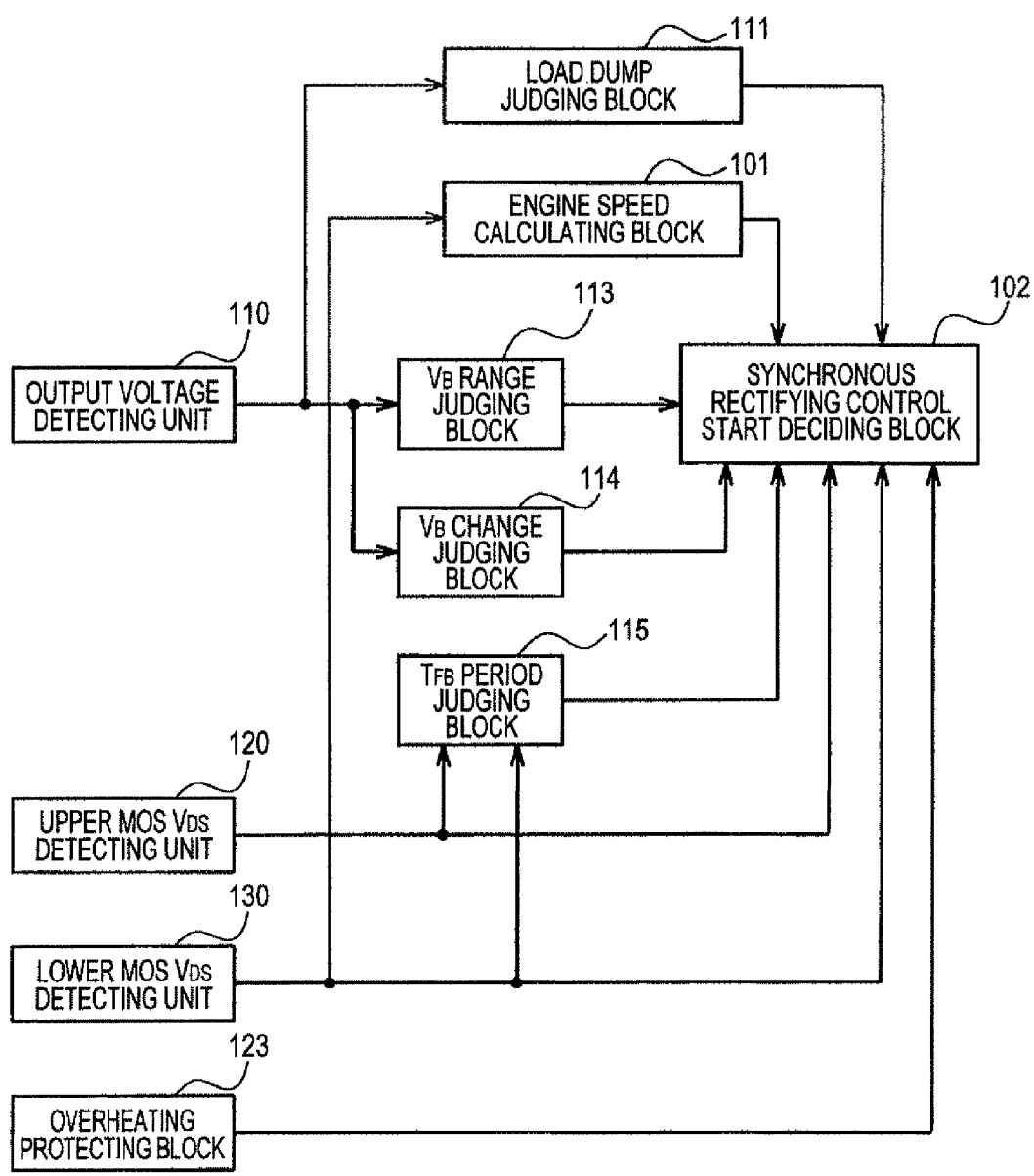
FIG. 10 is a block diagram of the control circuit required to decide a start of the synchronous control.

FIG. 10 is a block diagram of blocks and units of the control circuit 54 required to decide a start of the synchronous control. As shown in FIG. 8 and FIG. 10, the control circuit 54 further has a load dump judging block 111 and an overheating protecting block (denoting an overheating protecting unit in claims) 123. As shown in FIG. 10, the control circuit 54 further has a $V_B$ range judging block 113, a $V_B$ change judging block 114, and a $T_{FB}$ period judging block 115. The blocks and units 101, 102, 110, 111, 113, 114, 115, 120, 123 and 130 are used to decide a start of the synchronous control. When the output terminal B of the generator 1 is disconnected from the charging line 12 or when a battery terminal is disconnected from the positive electrode of the battery 9, a surge voltage is generated so as to be contained in the output voltage $V_B$, and the output voltage $V_B$ exceeds the level of 20V. This phenomenon is called a load damp.

The judging block 111 judges whether or not the output voltage $V_B$ detected in the detecting unit 110 exceeds the level of 20V due to the occurrence of a load dump (fourth start condition). When the output voltage $V_B$ exceeds the level of 20V, the judging block 111 judges that a load dump has occurred in the generator 1, and starts a load dump protecting operation. In this operation, the judging block 111 sends a load dump protecting instruction to the drivers 170 and 172. In response to this instruction, the driver 170 turns off the transistor 50 of the upper arm to keep the transistor 50 in the off state, and the driver 172 turns on the transistor 51 of the lower arm to keep the transistor 51 in the on state. Therefore, the output voltage $V_B$ detected in the detecting unit 110 is decreased. Thereafter, when the output voltage $V_B$ is decreased to 17V or less, the judging block 111 judges that the load damp has disappeared, and ends this load dump protecting operation. To avoid a surge voltage from being newly generated and contained in the output voltage $V_B$ in response to the turning-on and the turning-off of the transistors 50 and 51 performed at the start time and the end time of the load dump protecting operation, the judging block 111 starts and ends the load dump protecting operation during one lower arm on period Pla (see FIG. 9). Further, during the load dump protecting operation, the judging block 111 sets a LD flag in the on state and outputs a high-level signal, indicating the on-state LD flag, to the deciding block 102. When the judging block 111 ends the load dump protecting operation, the judging block 111 sets the LD flag in the off state, and outputs a low-level signal, indicating the off-state LD flag, to the deciding block 102.

The judging block 113 judges whether or not the output voltage $V_B$ detected in the detecting unit 110 is within a voltage range from 7V to 18V (second start condition). When the voltage $V_B$ is within the range, the judging block 113 judges that the output voltage $V_B$ is within a normal range, sets a voltage range flag in the off state, and outputs a low-level signal, indicating the off-state voltage range flag, to the deciding block 102. In contrast, when the voltage $V_B$ is out of the range ($V_B$<7V, or $V_B$>18V), the judging block 113 judges that the output voltage $V_B$ is abnormal, sets a voltage range flag in the on state, and outputs a high-level signal, indicating the on-state voltage range flag, to the deciding block 102.

The judging block 114 judges whether or not a change or fluctuation of the output voltage $V_B$ detected in the detecting unit 110 is smaller than a predetermined level change value of 0.5V/200 μs (fifth start condition). When the change is smaller than 0.5V/200 μs, the judging block 114 judges that the output voltage $V_B$ is sufficiently stable, sets a voltage change flag in the off state, and outputs a low-level signal, indicating the off-state voltage change flag, to the deciding block 102. In contrast, when the change is equal to or larger than 0.5V/200 μs, the judging block 114 judges that a change or fluctuation has occurred in the output voltage $V_B$, sets the voltage change flag in the on state, and outputs a high-level signal, indicating the on-state voltage change flag, to the deciding block 102.

The judging block 115 judges whether or not each of the periods $T_{FB1}$ and $T_{FB2}$ calculated in the calculating blocks 106 and 108 is longer than 15 μs (sixth start condition). When the periods $T_{FB1}$ and $T_{FB2}$ are longer than 15 μs together, the judging block 115 judges that no failure occurs, sets a $T_{FB}$ period flag in the off state, and outputs a low-level signal indicating the off-state $T_{FB}$ period flag to the deciding block 102. In contrast, when at least one of the periods $T_{FB1}$ and $T_{FB2}$ is equal to or shorter than 15 μs, the judging block 115 judges that a failure occurs, sets a $T_{FB}$ period flag in the on state, and outputs a high-level signal, indicating the on-state $T_{FB}$ period flag, to the deciding block 102.

The overheating protecting block 123 judges from the temperature signal of the detecting unit 150 (see FIG. 8) whether or not the transistors 50 and 51 are overheated to be set in an overheating state (third start condition). When at least one of the transistors 50 and 51 is overheated, the protecting block 123 judges that the rectifier module 5X is overheated, and performs an overheating protecting operation. This operation will be described later in detail. Further, the protecting block 123 sets an overheating flag in the on state to indicate the overheating of the rectifier module 5X, and sends a high-level signal, indicating the on-state overheating flag, to the deciding block 102. In contrast, when no transistor is overheated, the protecting block 123 sets the overheating flag in the off state and sends a low-level signal, indicating the off-state overheating flag, to the deciding block 102.

In this embodiment, the control circuit 54 has the blocks 113 to 115 to be separated from the block 102. However, the block 102 may perform the functions of the blocks 113 to 115. Further, when the first to sixth start conditions for a start of the synchronous control are satisfied, the deciding block 102 decide a start of the synchronous control, and the generator 1 is operated based on this control. However, when the first start condition and at least one of the second to sixth start conditions are satisfied, the deciding block 102 may decide a start of the synchronous control to operate the generator 1 in the synchronous control.

Figure 11:
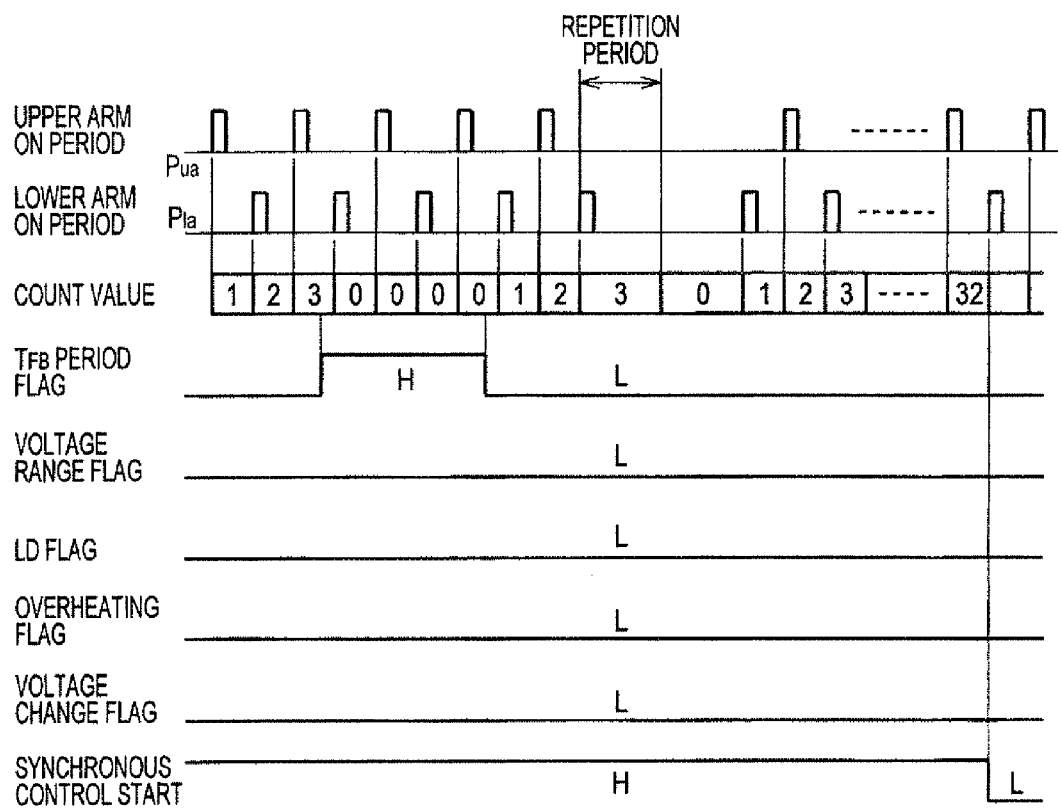
FIG. 11 is a timing chart showing an operation timing in the decision on a start of the synchronous control.

FIG. 11 is a timing chart showing an operation timing in the decision on a start of the synchronous control. In FIG. 11, a counter value indicates the number of leading edges (or start times) of upper arm on periods Pua and lower arm on periods Pla successively appearing in the phase voltage Vp. The $T_{FB}$ period flag indicates the level of the signal outputted from the judging block 115. The voltage range flag indicates the level of the signal outputted from the judging block 113. The LD flag indicates the level of the signal outputted from the judging block 111. The overheating flag indicates the level of the signal outputted from the protecting block 123. The voltage change flag indicates the level of the signal outputted from the judging block 114.

The deciding block 102 performs a counting operation so as to increment a counter value by one in synchronization with each of leading edges of upper arm on periods Pua and lower arm on periods Pla successively appearing. When the counter value reaches thirty-two, the deciding block 102 judges that the first to sixth start conditions for a start of the synchronous control are met, decides to start the synchronous control, and sends a low-level signal, indicating a start of the synchronous control, to the judging blocks 103 and 104. In response to this low-level signal, the judging blocks 103 and 104 alternately turn on the transistors 50 and 51 through the drivers 170 and 172 to start the synchronous control.

The deciding block 102 continues the counting operation on condition that the time interval between leading edges of one upper arm on period Pua and one lower arm on period Pla adjacent to each other is equal to or shorter than one repetition period (or the period corresponding to one cycle in electrical angle) of the X phase voltage Vp while the flags outputted from the blocks 115, 113, 111, 123 and 114 are set in the low level together. In contrast, when the deciding block 102 detects, before the counter value reaches thirty-two, that the time interval between leading edges of the upper arm on period Pua and the lower arm on period Pla is longer than one repetition period, or detects that at least one of the flags of the blocks 115, 113, 111, 123 and 114 is set at the high level, the deciding block 102 resets the counter value to zero and restarts the counting operation when the condition for the continuation of the counting operation is satisfied.

(4) Judgment on a Stop of the Synchronous Control

Next, the decision on a stop of the synchronous control being performed in the generator 1 is now described. As shown in FIG. 8, the control circuit 54 further has an abnormal off timing judging block 121 and asynchronous control stop deciding block 122. The deciding block 122 judges whether or not conditions for a stop of the synchronous control are satisfied. When judging that these conditions are satisfied, the deciding block 122 decides to stop the synchronous control, and sends a notice, indicating the stop of the synchronous control, to the blocks 102, 103, 104, 107 and 109. Thereafter, the stop of the synchronous control is continued until the deciding block 102 decides to start the synchronous control.

Five conditions for a stop of the synchronous control are as follows.

(C11) First stop condition: A specific period of time, from one off timing of the transistor 51 set in the calculating block 109, to a time at which the phase voltage Vp increased after this off timing reaches the first threshold value V10 used for a decision on a next on timing of the transistor 50, is shorter than a predetermined period of time.

This predetermined period is set so as to depend on a time lag from a time, at which the calculating block 109 instructs the driver 172 to turn off the transistor 51, to a time at which the driver 172 actually turns off the transistor 51. More specifically, the driver 172 turns off the transistor 51 by a driving power, and the predetermined period is set based on this driving power of the driver 172. When the first stop condition is satisfied because of the specific period shorter than the predetermined period, the judging block 121 judges that abnormality or delay in the timing off of the transistor 51 has occurred and outputs a high-level signal to the deciding block 122. In other case, the judging block 121 outputs a low-level signal to the deciding block 122.

Figure 12:
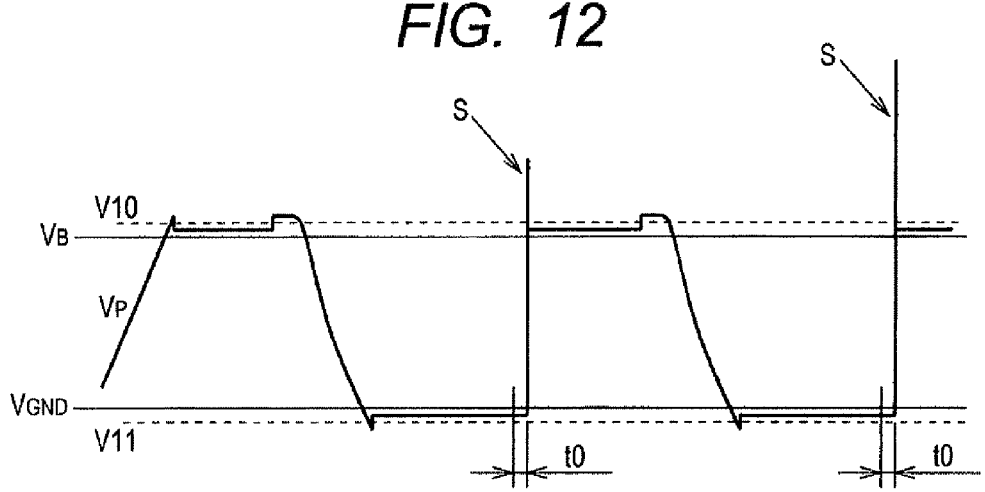
FIG. 12 is a view showing a waveform of an X phase voltage obtained when the off timing of a transistor of a lower arm is delayed.

FIG. 12 is a view showing a waveform of the X phase voltage Vp obtained when the off timing of the transistor 51 is delayed. As shown in FIG. 12, the off timing of the transistor 51 set in the calculating block 109 is delayed to be later than the end time of the corresponding lower arm on period Pla, an electric current flowing through the transistor 51 is stopped or interrupted at the end time of the lower arm on period Pla so as to generate a surge voltage S in the phase voltage Vp. This surge voltage S is generated just after the turning-off of the transistor 51. A period of time from a time, at which the calculating block 109 instructs the driver 172 to turn off the transistor 51, to a time at which the driver 172 actually turns off the transistor 51 is set as a period T0. To detect the generation of a surge voltage S caused by the off timing delay, the predetermined period is set to be longer than the period T0 by a value β such that the driver 172 actually turns off the transistor 51 when a period T0+β is elapsed after the calculating block 109 instructs the driver 172 to turn off the transistor 51. It is required that this β is shorter than a period of time from the elapse of the period T0 to a time at which the phase voltage Vp containing the surge voltage S is increased to the first threshold value V10 when the synchronous control is normally performed without any abnormal off timing.

(C12) Second stop condition: A specific period of time from one off timing of the transistor 50 set in the calculating block 107 to a time, at which the phase voltage Vp decreased after this off timing reaches the second upper threshold value V20 used for a decision on a next on timing of the transistor 51, is shorter than a predetermined period of time.

This predetermined period is set to depend on a time lag from a time, at which the calculating block 107 instructs the driver 170 to turn off the transistor 50, to a time at which the driver 170 actually turns off the transistor 50. More specifically, the driver 170 turns off the transistor 50 by a driving power, and the predetermined period is set based on this driving power of the driver 170. When this second stop condition is satisfied because of the specific period shorter than the predetermined period, the judging block 121 judges that abnormality or delay in the timing off of the transistor 50 occurs and outputs a high-level signal to the deciding block 122. In other case, the judging block 121 outputs a low-level signal to the deciding block 122.

The predetermined periods for the first and second stop conditions may be equal to each other or may differ from each other. Because these predetermined periods are set based on the driving power of the drivers 170 and 172, it is preferred that each of the predetermined periods be constant, regardless of the engine speed.

(C13) Third stop condition: A change or fluctuation in the output voltage $V_B$ is larger than 0.5V/200 μs. In the case of the continuation of the synchronous control, the allowable value of this change depends on the components of the generator 1 or computer programs. Therefore, the allowable value used for the decision of a stop of the synchronous control may be appropriately changed on the basis of the components or the like. The requirement of the allowable value appropriately changed is now described with reference to FIG. 13.

Figure 13:
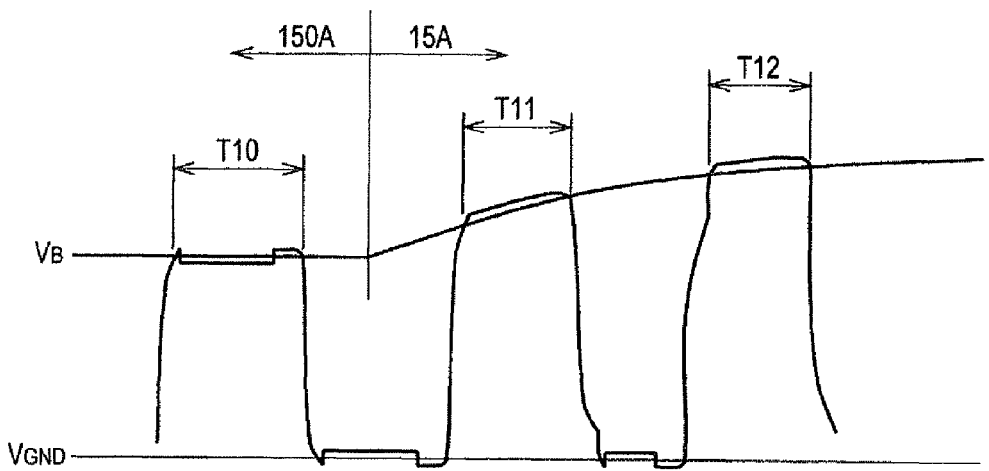
FIG. 13 is a view showing the relation between a change in an output voltage and the length of an upper arm on period.

FIG. 13 is a view showing the relation between a change in the output voltage $V_B$ and the length of the upper arm on period Pua. As shown in FIG. 13, when the output current is, for example, suddenly decreased from 150 A to 15 A, the output voltage $V_B$ is increased with time, and the length of the upper arm on period is shortened from T10, corresponding to the normal output voltage $V_B$, to T11 and T12 (T10>T11>T12) in that order with time. In the same manner, in response to a change or fluctuation of the output voltage $V_B$, the length of the lower arm on period is shortened with time.

Because the lengths of the upper and lower arm on periods are shortened with time in response to a change in the output voltage $V_B$, assuming that the off timings of the transistors 50 and 51 are set without considering a change in the output voltage $V_B$, the off timings of the transistors 50 and 51 are set to be later than the end times of the corresponding upper and lower arm on periods. To avoid this problem, the allowable value appropriately changed is used.

The allowable value appropriately changed is also used to decide a start of the synchronous control. The allowable value for a start of the synchronous control may differ from the allowable value for a stop of the synchronous control.

(C14) Fourth stop condition: The generator 1 is now set in the state of the load dump protection.

(C15) Fifth stop condition: Transistors 50 and 51 are now set in the overheating state.

Figure 14:
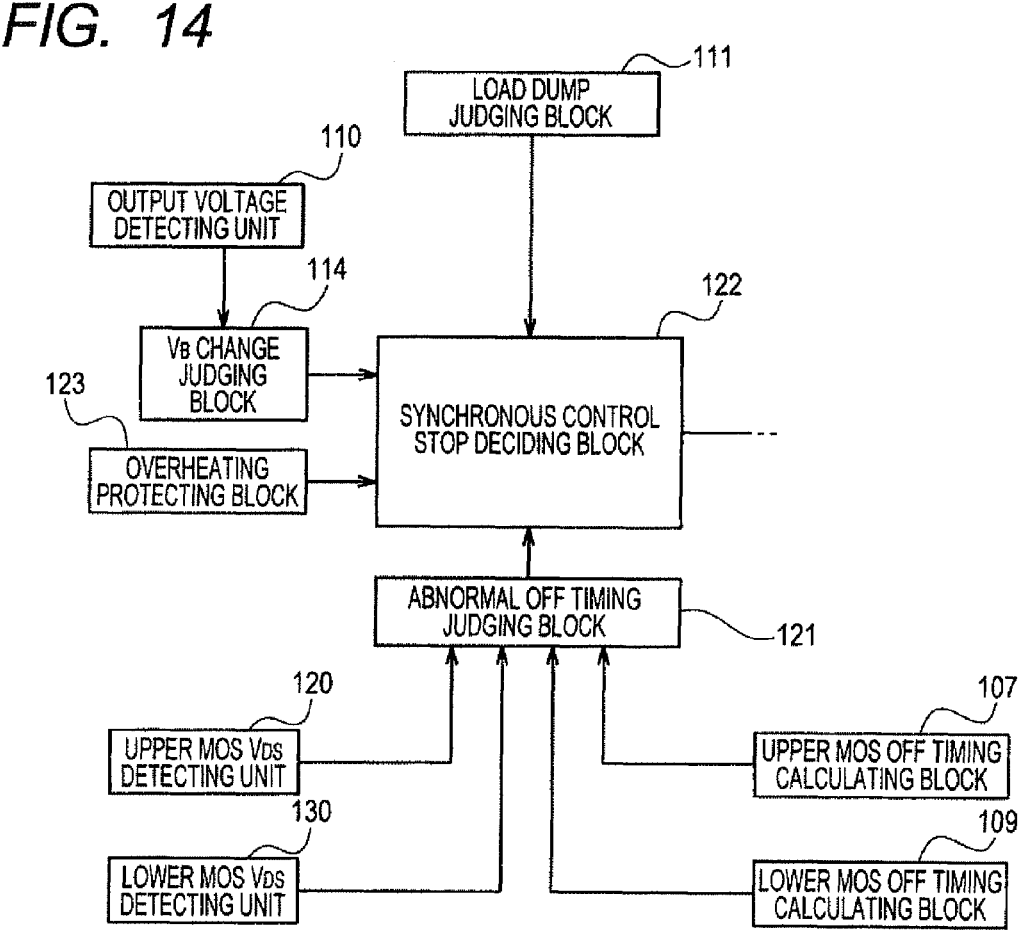
FIG. 14 is a block diagram of a section required to perform decision on a stop of the synchronous control.

FIG. 14 is a block diagram of a section required to perform the decision on a stop of the synchronous control. Components shown in FIG. 14 except the judging block 114 are picked up from the components shown in FIG. 8. The judging block 114 shown in FIG. 10 for the decision on a start of the synchronous control is also used for the decision on a stop of the synchronous control.

As shown in FIG. 14, when the judging block 121 judges that the first or second stop condition (C11) or (C12) is satisfied, the judging block 121 outputs a high-level signal to the deciding block 122. When the judging block 114 judges that the third stop condition (C13) is satisfied because of a change or fluctuation in the output voltage $V_B$ larger than 0.5V/200 μs, the judging block 114 outputs a high-level signal to the deciding block 122. When the judging block 111 judges that the fourth stop condition (C14) is satisfied because of the generator 1 set in the state of the load dump protection, the judging block 111 outputs a high-level signal to the deciding block 122. When the protecting block 123 judges that the fifth stop condition (C15) is satisfied because of the overheating flag set in the on state, the protecting block 123 outputs a high-level signal indicating the on-state overheating flag to the deciding block 122.

When at least one of the signals outputted from the blocks 121, 114, 111 and 123 is set in the high level, the deciding block 122 judges that the conditions for a stop of the synchronous control are satisfied, decides a stop of this control, and sends an instruction indicating a stop of the synchronous control to the judging block 102, the deciding blocks 103 and 104 and the calculating blocks 107 and 109 shown in FIG. 8.

(5) Overheating Protecting Operation

An overheating protecting operation performed in the protecting block 123 is now described. In this embodiment, when the protecting block 123 receives the temperature signal of the high level, indicating the occurrence of the overheating in the transistors 50 and 51, from the detecting unit 110, the protecting block 123 performs an overheating protecting operation by instructing the driver 170 to compulsorily turn off the transistor 50 and to keep the transistor 50 in the off state and by instructing the driver 172 to compulsorily turn on the transistor 5 and to keep the transistor 51 in the on state.

Figure 15A:
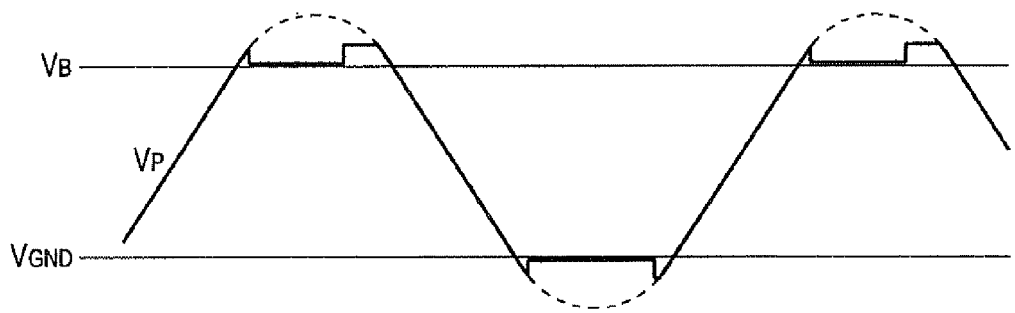
FIG. 15A is a view showing a waveform of an X phase voltage when no transistor is set in an overheating state.
Figure 15B:
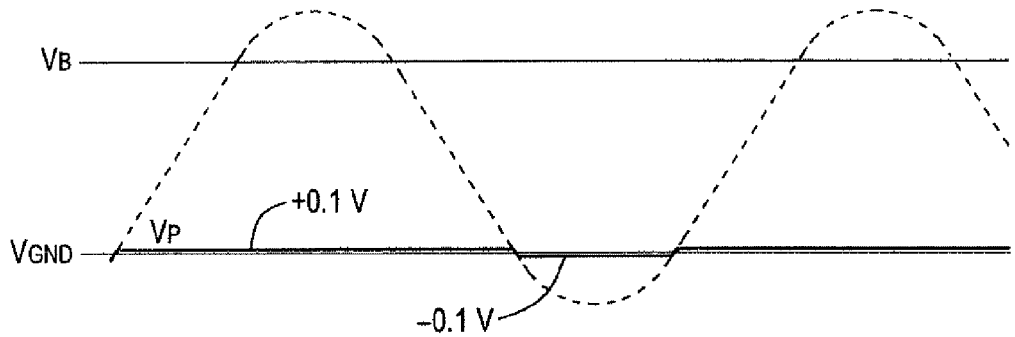
FIG. 15B is a view showing a waveform of an X phase voltage when an overheating protecting block is under an overheating protecting operation.
Figure 15C:
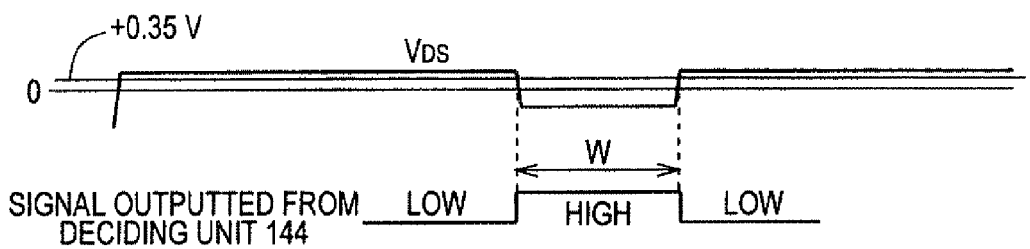
FIG. 15C is a view showing a waveform of an X phase voltage when a drain-source voltage of a transistor of the lower arm is amplified.

FIG. 15A is a view showing a waveform of the phase voltage Vp when no transistor is set in the overheating state, FIG. 15B is a view showing a waveform of the phase voltage Vp when the protecting block 123 is under the overheating protecting operation, and FIG. 15C is a view showing a waveform of the phase voltage Vp when the drain-source voltage $V_{DS}$ of the transistor 51 of the lower arm is amplified.

In the normal operation under the synchronous control, as shown in FIG. 15A, the phase voltage Vp reaches a value (hereinafter, called an upper limit) near to the output voltage $V_B$ (i.e., the voltage at the positive electrode of the battery 9), and reaches a value (hereinafter, called a lower limit) near to the ground terminal voltage $V_{GND}$. The phase voltage Vp is periodically changed between the upper limit and the lower limit.

In contrast, during the overheating protecting operation, as shown in FIG. 15B, because of the transistor 50 compulsorily set in the off state and the transistor 51 compulsorily set in the on state, the phase voltage Vp is periodically changed within the range from the value ($V_{GND}-V_{DS51}$) lower than the ground terminal voltage $V_{GND}$ by the drain-source voltage $V_{DS51}$ of the transistor 51 set in the on state to the value ($V_{GND}+V_{DS51}$) higher than the voltage $V_{GND}$ by the voltage $V_{DS51}$, while centering the phase voltage Vp at the voltage $V_{GND}$. In the example shown in FIG. 15B, the drain-source voltage $V_{DS}$ of the transistor 51 set in the on state is equal to 0.1V. This drain-source voltage $V_{DS}$ is changeable in dependent on specifications of the transistor 51, the gate voltage applied to the transistor 51 and the like.

As shown in FIG. 15C, the amplifying unit 142 shown in FIG. 4 amplifies the drain-source voltage $V_{DS}$ of the transistor 51 set in the on state by five times to periodically change the voltage $V_{DS}$ within the range from −0.5V to +0.5V. The deciding unit 144 compares the voltage $V_{DS}$ amplified by the unit 142 with a threshold voltage value of +0.35V. When the threshold voltage value is higher than the amplified voltage $V_{DS}$ in a time range W, the deciding unit 144 outputs a high-level signal to the protecting block 123. In other case, the deciding unit 144 outputs a low-level signal to the protecting block 123.

As shown in FIG. 15C, the range W periodically set almost accords with one lower MOS on period Plm in which the transistor 51 is set in the on state. In this embodiment, the start time and the end time of the overheating protecting operation are set in the range W. When the protecting block 123 turns on the transistor 51 at a certain time of the time range W to start the overheating protecting operation, an electric current starts flowing through the transistor 51 in a flow direction which is the same as the forward direction of the diode corresponding to the transistor 51. Therefore, the generation of a surge voltage can be suppressed at the start time of the overheating protecting operation. Further, when the protecting block 123 turns off the transistor 51 at a time of the range W to end the overheating protecting operation, the flow direction of the current flowing through the diode corresponding to the transistor 51 just after the turning-off of the transistor 51 is the same as the flow direction of the current flowing through the transistor 51 just before the turning-off of the transistor 51. Therefore, the generation of a surge voltage can be suppressed at the end time of the overheating protecting operation.

The threshold voltage value used in the deciding unit 144 may be changed along a hysteresis loop. For example, just after the amplified drain-source voltage $V_{DS}$ becomes lower than the threshold voltage value, the threshold voltage value is heightened to +0.35V. In contrast, just after the amplified voltage $V_{DS}$ becomes higher than the threshold voltage value, the threshold voltage is lowered to +0.30V. Therefore, even when the amplified voltage $V_{DS}$ is changed near the threshold voltage value, the deciding unit 144 can prevent the flow direction from changing too frequently.

The reference voltage Vref used in the detecting circuit 77 of the control device 7 shown in FIG. 2 is preset at a value higher than the drain-source voltage $V_{DS}$ of the transistor 51 set in the on state. During the normal operation of the generator 1, the phase voltage Vp periodically exceeds the reference voltage Vref, so that the detecting circuit 77 can detect the rotation of the rotor. In contrast, when the protecting block 123 performs the overheating protecting operation by keeping the transistor 50 set in the off state and keeping the transistor 51 set in the on state, the phase voltage Vp is periodically changed within the range of the drain-source voltage $V_{DS}$ (see FIG. 15B). Therefore, the control device 7 cannot detect the rotation of the rotor from the comparison between the phase voltage Vp and the reference voltage Vref. When detecting no rotation of the rotor or a stop of the rotation, the control device 7 stops or reduces the supply of an exciting current to the field coil 4. Therefore, the electric power generation of the generator 1 is stopped or suppressed, and heat generated by the power generation is suppressed. Further, after the power generation is stopped or suppressed, the rotor of the generator 1 is still rotated at high speed by the force of inertia for some time. Therefore, cooling fans attached to the rotor are rotated with the rotor so as to rapidly cool the rectifier module groups 5 and 6. Accordingly, the overheating protecting operation performed by the protecting block 123 can protect the rectifier module groups 5 and 6 from being failed or broken by the overheating.

Figure 16:
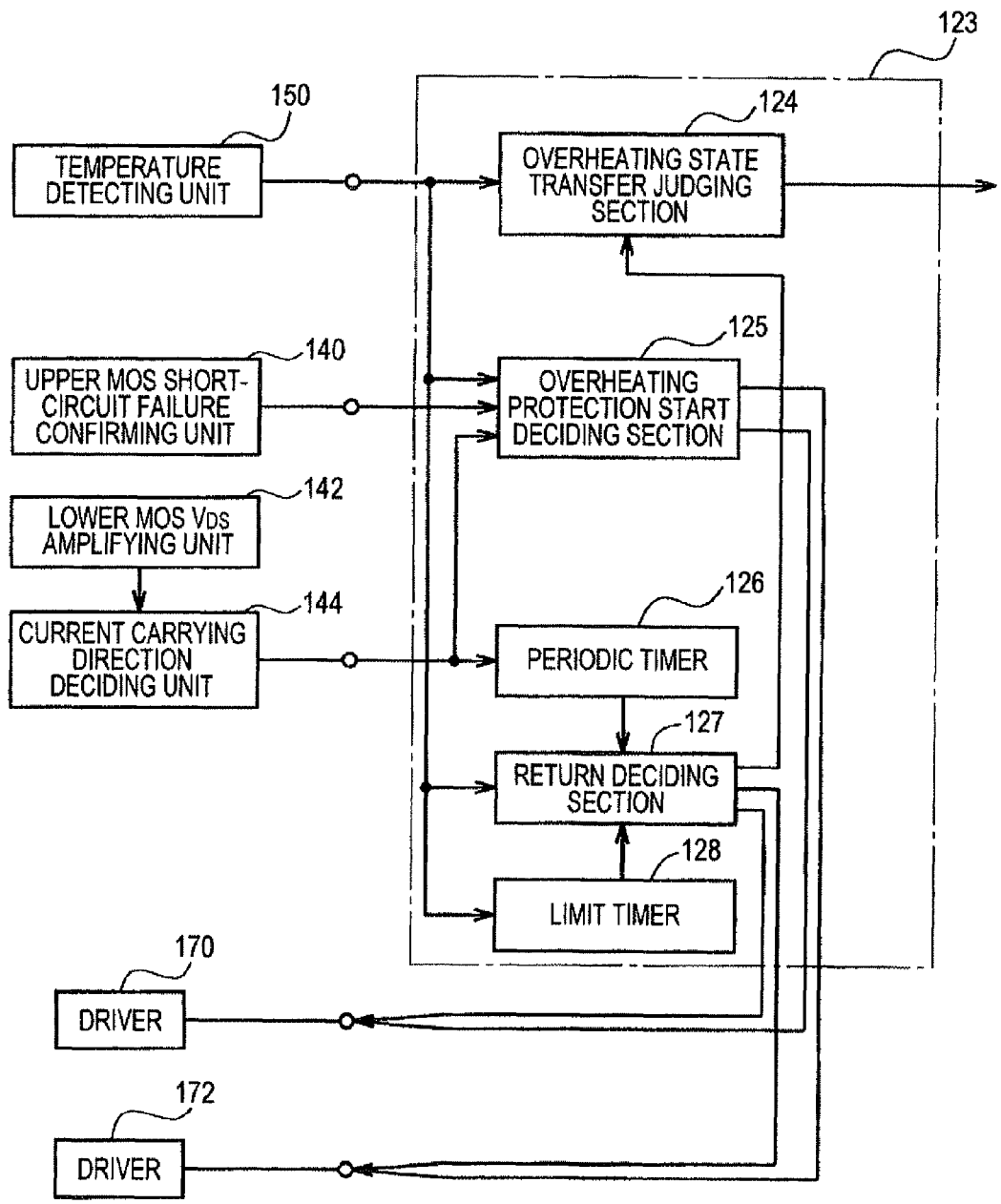
FIG. 16 is a block diagram of an overheating protecting block of the control unit shown in FIG. 8.

FIG. 16 is a block diagram of the protecting block 123. As shown in FIG. 16, to perform the overheating protecting operation, the protecting block 123 has an overheating state transfer judging section 124, an overheating protection start deciding section 125, a periodic timer 126, a return deciding section 127 and a limit timer 128.

When the detecting unit 150 detects that the temperature of the transistors 50 and 51 exceeds 200 degrees C. (° C.), the detecting unit 150 changes a temperature signal from the low level to the high level and outputs this high-level signal to the judging section 124 and the deciding sections 125 and 127. The judging section 124 judges from the high-level signal that the generator 1 is transferred to the overheating state, sets an overheating flag at the high level, and outputs a high-level signal to the deciding block 122.

Further, in response to a change of the temperature signal, from the low level to the high level, the deciding section 125 decides a start of the overheating protecting operation. Then, on condition that the deciding section 125 confirms that the signal outputted from the confirming unit 140 is set in the low level because of no occurrence of a short-circuit failure, the deciding section 125 outputs an instruction, indicating a start of the overheating protecting operation, to the drivers 170 and 172 at a specific timing at which the deciding unit 144 outputs the high-level signal, notifying that the present time is in the time range W (see FIG. 15C) appropriate to the overheating protecting operation, to the deciding section 125. In response to this instruction, the driver 170 turns off the transistor 50 to keep the transistor 50 in the off state, and the driver 172 turns on the transistor 51 to keep the transistor 51 in the on state. Therefore, the phase voltage Vp is periodically changed within the narrow range while centering the phase voltage Vp at the ground terminal voltage $V_{GND}$.

The timer 126 starts measuring an elapsed time which starts from a change in the signal, outputted from the deciding unit 144, from the low level to the high level. When the elapsed time reaches one-fourth of the repetition period (corresponding to one cycle of the voltage Vp) of the phase voltage Vp, the timer 126 outputs a time up signal to the deciding section 127.

When the temperature of the transistors 50 and 51 is decreased to 170° C. or less by the overheating protecting operation, the detecting unit 150 changes the temperature signal from the high level to the low level and outputs this signal to the judging section 124, the deciding sections 125 and 127 and the timer 128.

The timer 128 starts measuring an elapsed time which starts from a change in the signal, outputted from the detecting unit 150, from the high level to the low level. When the elapsed time reaches two repetition periods of the phase voltage Vp, the timer 128 outputs a time up signal to the deciding section 127.

Further, in response to the low-level signal of the detecting unit 150, the deciding section 127 judges that the overheating of the transistors 50 and 51 is ended, decides the end of the overheating protecting operation, and decides the return to the normal operation. More specifically, in response to the low-level signal, the deciding section 127 decides the outputting time of the time up signal, sent from the timer 126, as an end timing of the overheating protecting operation. When receiving no signal from the timer 126, the deciding section 127 decides the outputting time of the time up signal, sent from the timer 128, as an end timing of the overheating protecting operation. Then, the deciding section 127 sends a notice indicating this end timing to the judging section 124. In response to this notice, the judging section 124 resets the overheating flag to the off state and outputs a low-level signal indicating the off-state flag to the deciding block 122. Further, the deciding section 127 deciding the end timing of the overheating protecting operation sends an instruction to the drivers 170 and 172. In response to this instruction, the drivers 170 and 172 turnoff the transistors 50 and 51 to set the transistors 50 and 51 in the off state together.

Because the elapsed time in the timer 126 starts at the start of the time range W shown in FIG. 15C, the deciding section 127 sets the end timing of the overheating protecting operation at a time at which one-fourth of the repetition period of the phase voltage Vp is elapsed from the start of the time range W. Therefore, the overheating protecting operation can be reliably ended during the diode current carrying period in which electric current flows through the diode corresponding to the transistor 51. Accordingly, no surge voltage derived from the turning-off of the transistor 51 is generated or contained in the phase voltage Vp. The one-fourth of the repetition period of the phase voltage Vp elapsed until the timer 126 outputs a time up signal may be changed.

The time up signal of the timer 128 is sent to the deciding section 127 to make provision against a failure in the decision of the deciding section 127 performed based on both the signal of the deciding unit 144 and the time up signal of the timer 126. For example, when a failure occurs in the timer 126, no signal is sent from the timer 126 to the deciding section 127. Therefore, assuming that no signal is sent from the timer 128 to the deciding section 127, the deciding section 127 cannot decide the end timing of the overheating protecting operation. However, in this embodiment, because the deciding section 127 can decides the end timing of the overheating protecting operation by using the time up signal of the timer 128, the deciding section 127 can compulsorily end the overheating protecting operation at the end timing. The two repetition periods of the phase voltage Vp elapsed until the timer 128 outputs a time up signal may be changed.

As described above, in the generator 1 according to the embodiment, the module 5X representing the modules 5X, 5Y, 5Z, 6U, 6V and 6W is overheated, the transistor 51 of the lower arm is set in the on state, the transistor 50 of the upper arm is set in the off state, and the phase voltage Vp is set within the range of the drain-source voltage $V_{DS}$ of the transistor 51, set in the on state, to place the phase voltage Vp near the ground terminal voltage $V_{GND}$. Therefore, the control device 7 cannot detect the rotation of the rotor, and the control device 7 stops or reduces the supply of the exciting current to the field coil 4 in response to no detection of the rotation so as to stop or reduce the heat generated in the module 5X. Accordingly, the module 5X can be reliably and rapidly released from the overheating state so as to protect the module 5X from the overheating. Further, no connection line for notifying the overheating state of the module 5X to the control device 7 is required, so that the wiring and structure of the generator 1 can be simplified.

Particularly, the transistors of the low arm represented by the transistor 51 are connected with the body earth of the vehicle, the phase voltage Vp determined by the transistor 51 set in the on state during the overheating protecting operation can be fixed near the ground terminal voltage $V_{GND}$. Accordingly, the detection of the rotation of the rotor based on the phase voltage Vp can be stopped.

Further, because the protecting block 123 starts the overheating protecting operation after the confirming unit 140 confirms that no short circuit occurs, the generator 1 can reliably prevent a short circuit from being caused between the terminals of the battery 9 through the transistors 50 and 51. Moreover, because each of the rectifier modules has a structure for the overheating protection, the overheating protection can be performed for each rectifier module.

In the generator 1 according to this embodiment, each of six rectifier modules 5X, 5Y, 5Z, 6U, 6V and 6W is provided with the temperature detecting unit 150 and the overheating protecting block 123, and each of the rectifier modules performs the overheating protecting operation when judging that the module is overheated. Therefore, when the temperature of the whole rectifier modules is increased, each rectifier module starts the overheating protecting operation at a start timing which is determined regardless of the start timings of the overheating protecting operations performed in the other rectifier modules. In this case, when the rectifier module 5X, corresponding to the X phase coil used for the rotation detection performed by the control device 7, starts the overheating protecting operation, the device 7 stops or reduces the supply of the exciting current to the field coil 4.

In this embodiment, when the rectifier module 5X detects the occurrence of overheating, the module 5X turns off the transistor 50 of the upper arm to keep the transistor 50 in the off state, while turning on the transistor 51 of the lower arm to keep the transistor 51 in the on state. However, when the rectifier module 5X detects the occurrence of overheating, the module 5X may turn on the transistor 50 to keep the transistor 50 in the on state, while turning off the transistor 51 to keep the transistor 51 in the off state. In this case, the phase voltage Vp is periodically changed within the narrow range from the value ($V_B - V_{DS50}$) lower than the output voltage $V_B$ by the drain-source voltage $V_{DS50}$ of the transistor 50 set in the on state to the value ($V_B + V_{DS50}$) higher than the output voltage $V_B$ by the voltage $V_{DS50}$, while centering the phase voltage Vp at the output voltage $V_B$.

Next, modifications of this embodiment will be described. In modifications, when one of the rectifier modules detects or judges that this module is transferred to the overheating state due to the occurrence of overheating in this module, all the rectifier modules start the overheating protecting operations almost at the same timing to protect the generator 1 from heat generated in the overheated module.

First Modification

The generator 1 has a common heat dissipating member to which each of the rectifier modules 5X, 5Y, 5Z, 6U, 6V and 6W is fixedly attached. When overheating has occurred in one of the rectifier modules, heat generated in the overheated rectifier module is quickly transferred to the other rectifier modules through the heat dissipating member. Each of the other rectifier modules receiving the transferred heat starts the overheating protecting operation to decrease the temperature of the rectifier module. Therefore, not only one rectifier module, in which overheating has occurred, starts the overheating protecting operation in response to the occurrence of overheating, but also each of the other rectifier modules starts the overheating protecting operation in response to the heat transferred through the heat dissipating member.

Accordingly, the difference in start timings of the overheating protecting operations performed in all the rectifier modules can be reduced. That is, because the detecting units 150

(see FIG. 16) in all the rectifier modules can detect the occurrence of overheating almost at the same timing, all the rectifier modules can start the overheating protecting operations almost at the same timing to protect the generator 1 from heat generated in the overheated module.

Further, because it is not required to notify the occurrence of overheating in one rectifier module to the other rectifier modules, no communication line for notifying the occurrence of overheating is required. Accordingly, the wiring and structure in the generator 1 can be simplified.

Figure 17:
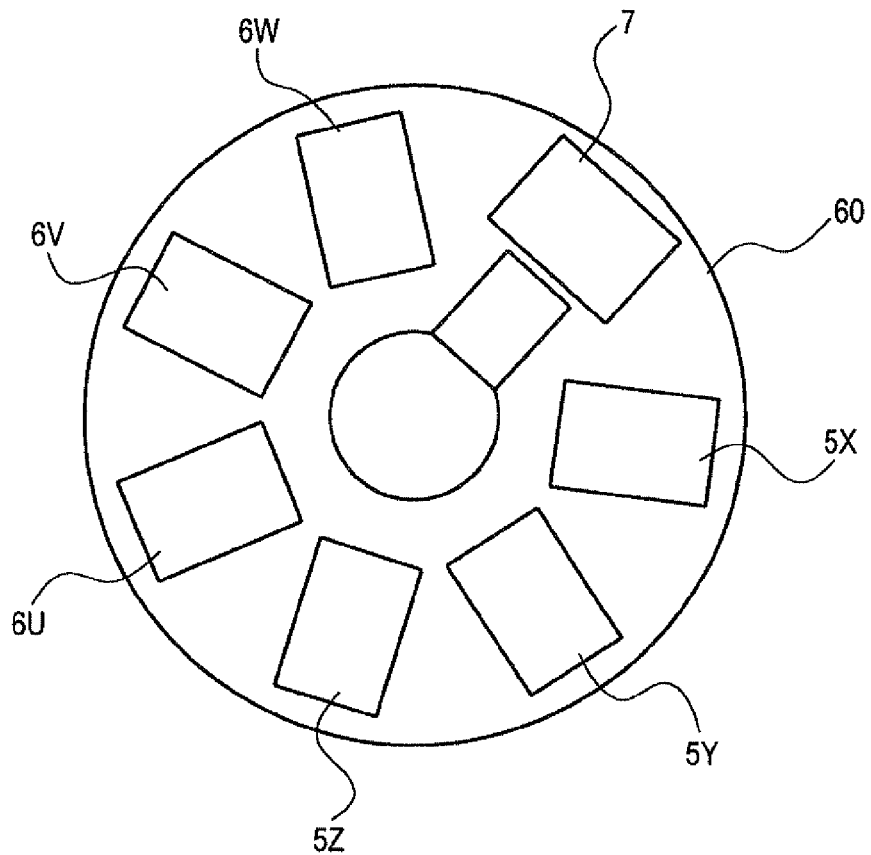
FIG. 17 is a plan view of rectifier modules attached to a rear frame according to the first modification of the embodiment.
Figure 18:
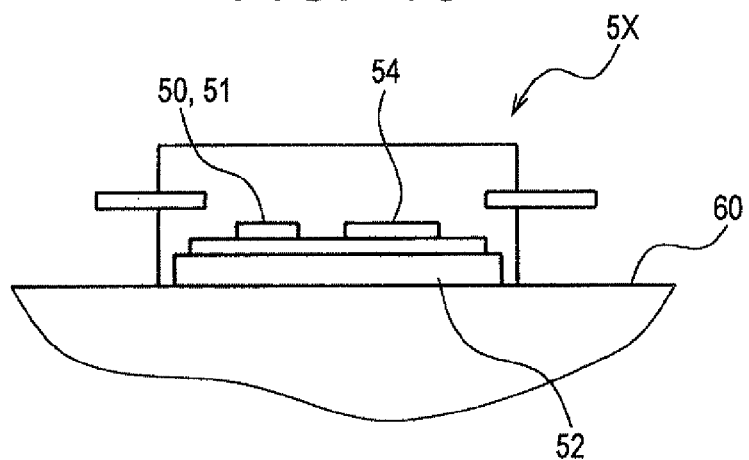
FIG. 18 is a side view of one rectifier module according to the first modification.

FIG. 17 is a plan view of the rectifier modules attached to a rear frame according to the first modification of the embodiment. FIG. 18 is a side view of the rectifier module 5X according to the first modification. As shown in FIG. 17, each of the rectifier modules is fixedly attached to a rear frame 60 of the generator 1. The frame 60 is made of a material (e.g., aluminium) having a high thermal conductivity. The rectifier modules 5X, 5Y, 5Z, 6U, 6V and 6W are arranged on one surface of the frame 60 at equal intervals. As shown in FIG. 18, the rectifier module 5X representing the rectifier modules has the transistors 50 and 51, the control circuit 54 and a heat sink 52 directly attached to the frame 60. The heat sink 52 may be indirectly attached to the frame 60 through an adhesive having a high thermal conductivity. When heat is transferred from another rectifier module through the frame 60, this heat sink 52 receives the heat so as to increase the temperature of the rectifier module 5X. In contrast, when overheating has occurred in the module 5X, the heat sink 52 receives heat of the transistors 50 and 51, the control circuit 54 and transfers the heat to the other modules through the frame 60.

As described above, the overheating protecting blocks 123 of the rectifier modules 5X, 5Y, 5Z, 6U, 6V and 6W are connected with one another, and each of the blocks 123 sends information, indicating that the block 123 is now performing the overheating protecting operation, to the other overheating protecting blocks 123 and receives information, indicating that one of the other overheating protecting blocks 123 is now performing the overheating protecting operation, from the one of the other overheating protecting blocks 123.

Accordingly, heat of one rectifier module, in which overheating has occurred, can be efficiently and rapidly transferred to the other rectifier modules through the frame 60, and all the rectifier modules can start the overheating protecting operations almost at the same timing to protect the generator 1 from heat generated in the overheated module.

In this modification, the rear frame 60 is used as the heat dissipating member. However, a heat dissipating plate made of aluminium or copper may be arranged as the heat dissipating member in the generator 1 in addition to the frame 60 such that the rectifier modules are fixedly attached to this plate.

Second Modification

The overheating protecting blocks 123 of the rectifier modules 5X, 5Y, 5Z, 6U, 6V and 6W are connected with one another through a common connection line. A voltage signal, indicating that at least one of the rectifier modules is now performing the overheating protecting operation, is sent from this module to the other rectifier modules through the connection line.

Figure 19:
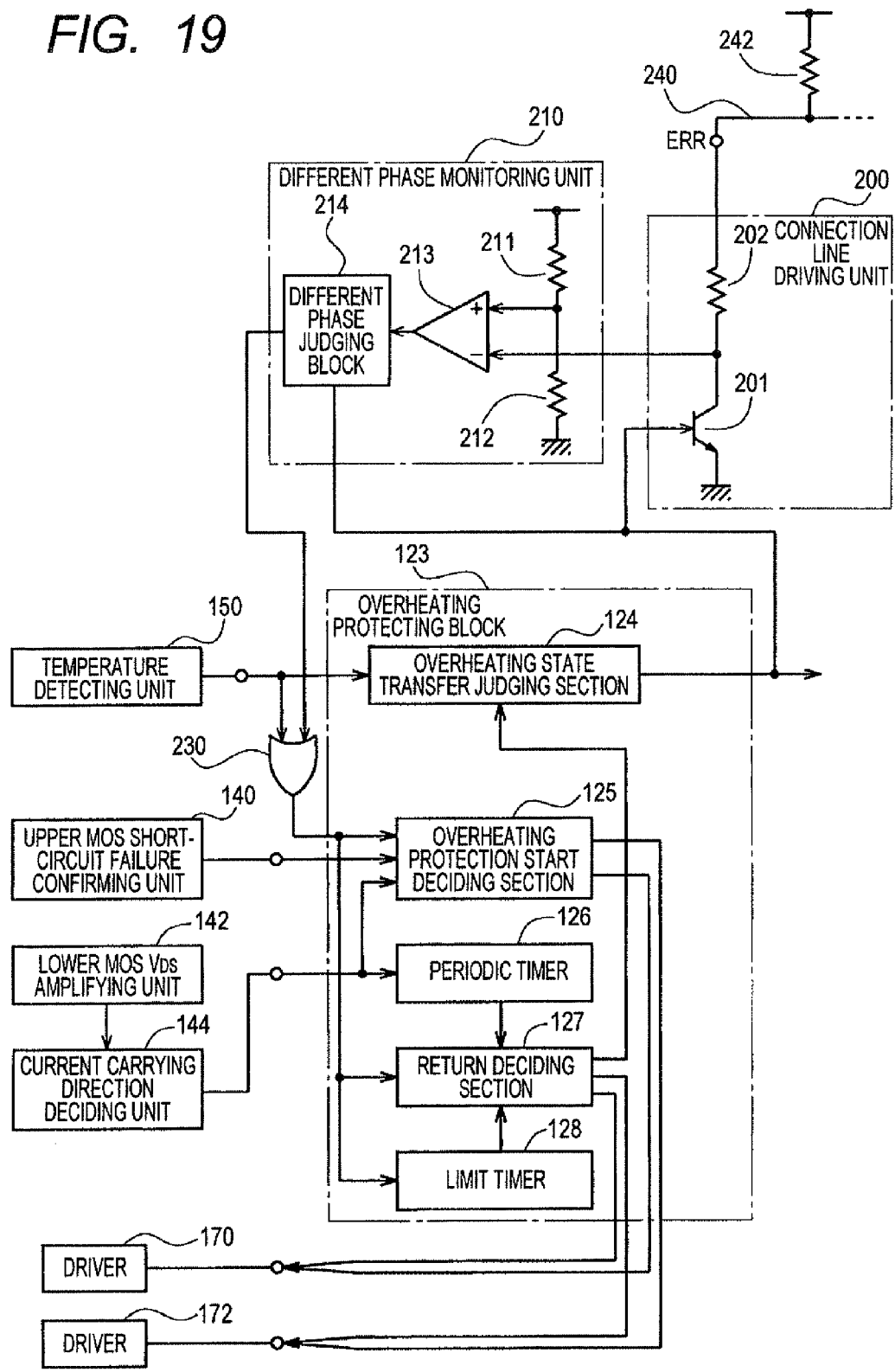
FIG. 19 is a block diagram of one rectifier module required to receive and send a voltage signal indicating occurrence of overheating according to the second modification of the embodiment.

FIG. 19 is a block diagram of one rectifier module required to receive and send a voltage signal indicating the occurrence of overheating according to the second modification of this embodiment. As shown in FIG. 19, the generator 1 has a connection line 240, a pull-up resistor 242 through which the connection line 240 is pulled up to the high level, a connection line driving unit 200 arranged in each rectifier module, and a different phase monitoring unit 210 arranged in each rectifier module. The connection line 240 is connected with an error terminal ERR of the driving unit 200 of each rectifier module, and the driving units 200 of the rectifier modules are connected with one another through the connection line 240. The driving unit 200 of each rectifier module drives the connection line 240 in response to the high-level signal (i.e., the overheating flag set in the on state) outputted from the judging section 124. The driving unit 200 has a bipolar transistor 201 and a resistor 202 connected with the collector of the transistor 201.

When overheating has occurred in one rectifier module 5X representing the rectifier modules, the judging section 124 of the rectifier module 5X outputs a high-level signal indicating the on-state overheating flag to the base of the transistor 201, the transistor 201 is turned on, and the connection line 240 communicates with the earth through the resistor 202 and the transistor 201 of the rectifier module 5X to beset in the low level. Therefore, the connection line 240 can keep the low level in response to the occurrence of overheating in one of the rectifier modules.

The monitoring unit 210 of the module 5X has a voltage dividing block composed of two resistors 211 and 212 serially connected with each other, a voltage comparator 213 for comparing a detected voltage at a connection point between the transistor 201 and the resistor 202 with a reference voltage at a connection point between the resistors 211 and 212, and a different phase judging block 214 for judging from the comparison of the comparator 213 whether or not overheating has occurred in at least one of the other rectifier modules.

When overheating has occurred in at least one of the other rectifier modules, the connection line 240 is set in the low level, a detected voltage at a connection point between the transistor 201 and the resistor 202 is decreased to be lower than the reference voltage, and the comparator 213 outputs a high-level signal in response to the detected voltage lower than the reference voltage. The judging block 214 receives the signal outputted from the judging section 124 in addition to the signal of the comparator 213, and performs the judgment based on the signal of the comparator 213 and the signal of the judging section 124 that overheating has occurred in at least one of the other rectifier modules.

More specifically, when the judging block 214 receives a low-level signal, indicating no occurrence of overheating in the module 5X, from the judging section 124, the judging block 214 realizes that the connection line 240 is set in the low level due to the occurrence of overheating in one of the other rectifier modules, and the judging section 124 judges that overheating has occurred in at least one of the other rectifier modules. Therefore, the judging block 214 outputs a high-level signal indicating the overheating state set in one of the other rectifier modules. In contrast, when the judging block 214 receives a high-level signal, indicating the occurrence of overheating in the module 5X, from the judging section 124, the judging block 214 realizes that the connection line 240 is set in the low level due to the occurrence of overheating in the rectifier module 5X, and keeps outputting a low-level signal. Therefore, the judging block 214 can perform only the judgment about the occurrence of overheating in the other rectifier modules different from the module 5X.

The generator 1 further has an OR circuit 230 for outputting a high-level signal, indicating that overheating has occurred in one of the rectifier modules, to the judging sections 125 and 127 and the timer 128 in response to the high-level signal of the detecting unit 150 or the judging section 214. When the OR circuit 230 receives the high-level signal, indicating the overheating occurred in one of the other rectifier modules, from the judging block 214 or receives the high-level signal, indicating the occurrence of overheating in this rectifier module 5X, from the detecting unit 150, the judging sections 125 and 127 and the timer 128 receives a high-level signal, indicating the occurrence of overheating in the rectifier modules, from the OR circuit 230, and the protecting block 123 performs the overheating protecting operation in the same manner as in the embodiment. In contrast, when no high-level signal is received in the OR circuit 230, no overheating protecting operation is performed by the protecting block 123.

As described above, the overheating protecting blocks 123 of the rectifier modules 5X, 5Y, 5Z, 6U, 6V and 6W are connected with one another, and each of the blocks 123 sends information, indicating that the block 123 is now performing the overheating protecting operation, to the other overheating protecting blocks 123 and receives information, indicating that one of the other overheating protecting blocks 123 is now performing the overheating protecting operation, from the one of the other overheating protecting blocks 123.

Accordingly, any specific rectifier module, in which no overheating occurs, can be transferred to the state of the overheating protecting operation in response to the occurrence of overheating in one of the other rectifier modules, in the same manner as the case where overheating occurs in the specific rectifier module.

Further, when one of the rectifier modules judges that this module is changed to the overheating state due to the occurrence of overheating in this module, all the rectifier modules can start the overheating protecting operations almost at the same timing to protect the generator 1 from heat generated in the overheated module.

In this modification, the connection line 240 may be connected with the signal line, connecting the device 7 and the ECU 8, without being connected with the pull-up resistor 242. A high-level signal is always transmitted between the device 7 and the ECU 8 through the signal line. In this case, when the module 5X is set in the normal state without the occurrence of overheating, the connection line 240 is temporarily set in the low level. However, the judging section 124 can easily distinguish the low level, successively set in the connection line 240 due to the occurrence of overheating in another rectifier module, from the low level temporarily set in the connection line 240. Therefore, the judging section 124 can reliably judge whether or not overheating has occurred in one of the other rectifier modules.

In the example shown in FIG. 19, the connection line 240 is pulled up by the pull-up resistor 242 connected with a high-voltage source line and is set in the low level in response to the occurrence of overheating in one of the rectifier modules. However, the connection line 240 set in the low level by a pull-down resistor may be transferred to the high level in response to the occurrence of overheating in one of the rectifier modules. In this case, the emitter of the transistor 201 is connected with a high-voltage source line.

Third Modification

The overheating protecting blocks 123 of the rectifier modules 5X, 5Y, 5Z, 6U, 6V and 6W are connected with one another through the signal line, connecting the device 7 and the ECU 8, and information, indicating that one rectifier module is now performing the overheating protecting operation, is sent from this rectifier module to the other rectifier modules through the signal line.

Figure 20:
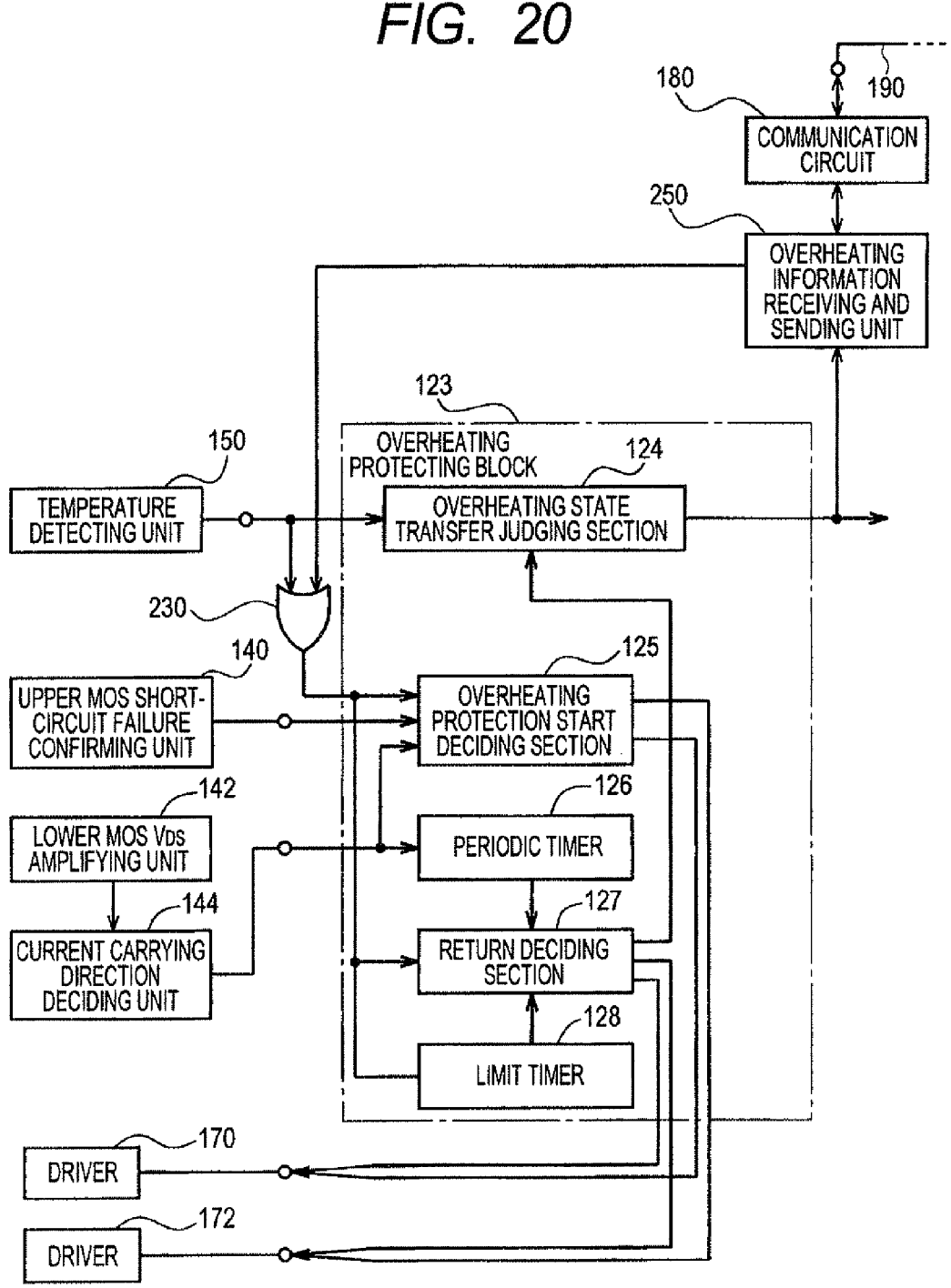
FIG. 20 is a block diagram of one rectifier module required to receive and send information indicating occurrence of overheating according to the third modification of the embodiment.

FIG. 20 is a block diagram of one rectifier module required to receive and send information indicating the occurrence of overheating according to the third modification of this embodiment. As shown in FIG. 20, the generator 1 has a communication line 190, a communication circuit 180 arranged in each rectifier module, an overheating information receiving and sending unit 250 arranged in each rectifier module, and the OR circuit 230 arranged in each rectifier module. The communication circuits 180 of the modules are connected with one another through the communication line 190, and the line 190 is connected with a communication terminal connecting the device 7 and the ECU 8. Each communication circuit 180 performs a two-way communication or a serial communication, for example, using a local interconnect network (LIN) protocol with the other circuits 180, the control device 7 and the ECU 8 through the communication line 190 to receive or send a communication message.

When the receiving and sending unit 250 of the rectifier module 5X receives a high-level signal, indicating the overheating flag set in the on state, from the judging section 124, the unit 250 sends information, indicating that overheating has occurred in the rectifier module 5X, to the other rectifier modules through the communication circuit 180 and the line 190. Further, when the unit 250 receives information, indicating that overheating has occurred in one of the other rectifier modules, from the line 190 through the communication circuit 180, the unit 250 outputs a high-level signal to the OR circuit 230.

When the OR circuit 230 receives a high-level signal from the detecting unit 150 or the unit 250, the OR circuit 230 outputs a high-level signal to the judging sections 125 and 127 and the timer 128.

As described above, the overheating protecting blocks 123 of the rectifier modules 5X, 5Y, 5Z, 6U, 6V and 6W are connected with one another, and each of the blocks 123 sends information, indicating that the block 123 is now performing the overheating protecting operation, to the other overheating protecting blocks 123 and receives information, indicating that one of the other overheating protecting blocks 123 is now performing the overheating protecting operation, from the one of the other overheating protecting blocks 123.

Accordingly, any specific rectifier module, in which no overheating occurs, can be transferred to the state of the overheating protecting operation in response to the occurrence of overheating in one of the other rectifier modules, in the same manner as the case where overheating occurs in the specific rectifier module.

Further, when one of the rectifier modules judges that this module is transferred to the overheating state due to the occurrence of overheating in this module, all the rectifier modules can start the overheating protecting operations almost at the same timing to protect the generator 1 from heat generated in the overheated module.

This embodiment and these modifications should not be construed as limiting the present invention to structures of the embodiment and modifications, and the structure of this invention may be combined with that based on the prior art. For example, in this embodiment, for the purpose of suppressing the occurrence of a surge voltage, the on or off timing of the transistor 51 of the lower arm is adjusted. However, to perform the overheating protecting operation, the adjustment of the on or off timing of the transistor 51 is not necessarily required. In this case, none of the confirming unit 140, the amplifying unit 142, the deciding unit 144, the judging section 127 and the timers 126 and 127 are needed in any rectifier module of the generator 1.

Further, in the embodiment and modifications, each of the rectifier modules corresponding to the respective phases of the stator coils 2 and 3 detects the occurrence of overheating and performs the overheating protecting operation. However, each of rectifier modules corresponding to the respective stator coils 2 and 3 may detect the occurrence of overheating to perform the overheating protecting operation, or one rectifier module corresponding to the stator coils 2 and 3 may detect the occurrence of overheating to perform the overheating protecting operation. In this case, in the first modification, the transistor 50 of the upper arm and the transistor 51 of the lower arm are attached to the plate 60 for each of the phases of the stator coils 2 and 3.

Moreover, in the embodiment, the first threshold value V10 (see FIG. 9), used to set the on timing of the transistor 50, and the first threshold value V11 (see FIG. 9), used to set the on timing of the transistor 51, are also used to judge abnormality in the off timing of each of the transistors 50 and 51 (see FIG. 12). However, a second upper threshold value V20 (see FIG. 9), used to detect the end time of the diode current carrying period of the diode connected with the transistor 50, and the second threshold value V21 (see FIG. 9), used to detect the end time of the diode current carrying period of the diode connected with the transistor 51, may be used to judge abnormality in the off timing of each of the transistors 50 and 51. In this case, when a period of time from the off timing of the transistor 50 to the end time of the upper arm on period Pua, at which the output signal of the upper MOS $V_{DS}$ detecting unit 120 is changed from the high level to the low level, in one repetition period is shorter than a predetermined value, the abnormal off timing judging block 121 judges that the off timing of the transistor 50 is abnormal. Further, when a period of time from the off timing of the transistor 51 to the end time of the lower arm on period Pla, at which the output signal of the lower MOS $V_{DS}$ detecting unit 130 is changed from the high level to the low level, in one repetition period is shorter than a predetermined value, the judging block 121 judges that the off timing of the transistor 51 is abnormal. Therefore, by using the second threshold values V20 and V21, the generator 1 can reliably detect the abnormality in the off timing before the occurrence of a surge voltage caused by the off timing of the transistor 50 or 51 set abnormally or during a period of time in which a surge voltage caused is low.

Furthermore, in the embodiment, the generator 1 has two stator coils 2 and 3 and two rectifier module groups 5 and 6. However, the generator 1 may have only a single stator coil and a single rectifier module group.

Still further, in the embodiment, each of the rectifier module groups 5 and 6 has three rectifier modules corresponding to respective phases. However, each of the rectifier module groups 5 and 6 may have a plurality of rectifier modules of which the number differs from three.

As described above, in the embodiment and modifications, the generator 1 detects that the phase voltage Vp reaches the threshold value just after the off timing of the transistor 50 or 51 or before a predetermined period of time is elapsed after the off timing of the transistor 50 or 51. Therefore, the generator 1 can confirm that the off timing of the transistor 50 or 51 is delayed so as to be later than the diode current carrying period, and the generator 1 can reliably detect the abnormality in the off timing of the transistor 50 or 51.

What is claimed is:

1. An electric rotating machine for a vehicle, comprising:
   a field coil of a rotor which magnetizes field magnetic poles of the rotor in response to an exciting current flowing through the field coil and generates a rotating magnetic field from a rotation of the rotor and the magnetized field magnetic poles;
   an armature coil of a stator, forming a multi-phase coil, which generates an alternating current voltage induced by the rotating magnetic field;
   a switching unit, formed of a bridge circuit having a switching element of an upper arm and a switching element of a lower arm, which rectifies the alternating current voltage induced in the armature coil to an output voltage;
   a switching control unit which controls each of the switching elements of the switching unit to be set in an on state or an off state;
   a generator control device which controls the exciting current supplied to the field coil to control the output voltage of the switching unit, detects the rotation of the rotor from a phase voltage of the alternating current voltage of the armature coil, and stops or reduces the supply of the exciting current to the field coil when detecting no rotation of the rotor or a stop of the rotation of the rotor;
   a temperature detecting unit which detects a temperature of the switching unit; and
   an overheating protecting unit which performs an overheating protecting operation, when detecting that the temperature of the switching unit detected by the temperature detecting unit indicates overheating of the switching unit, to set one of the switching elements of the upper and lower arms in the on state and sets the other switching element in the off state.

2. The machine according to claim 1, wherein the overheating protecting unit sets the switching element of the lower arm in the on state, and sets the switching element of the upper arm in the off state.

3. The machine according to claim 1, wherein the switching elements of the upper and lower arms in the switching unit rectify a phase voltage composing the alternating current voltage, a large and small relation between the phase voltage and a reference voltage is periodically changed when the rotor is rotated, the generator control device detects the rotation of the rotor from a periodic change in the relation, and the relation is fixed when the overheating protecting unit sets one of the switching elements of the upper and lower arms in the on state.

4. The machine according to claim 1, further comprising:
   a short-circuit failure confirming unit which confirms whether or not a short circuit has occurred in the other switching element to be set in the off state in the overheating protecting operation by the overheating protecting unit, and the overheating protecting unit starts the overheating protecting operation when the short-circuit failure confirming unit confirms that no short circuit occurs.

5. The machine according to claim 1, wherein the overheating protecting unit turns on one of the switching elements at a specific timing, at which generation of a surge voltage due to the turning-on of the switching element is suppressed, to set the switching element in the on state.

6. The machine according to claim 5, wherein the switching unit has a diode connected with the switching element set in the on state by the overheating protecting unit, and an electric current flows through the switching element, set in the on state by the overheating protecting unit at the specific timing, in a flow direction which is the same as a forward direction of the diode.

7. The machine according to claim 1, wherein the overheating protecting unit turns off the switching element, set in the on state by the overheating protecting unit in the overheating protecting operation, at a specific timing, at which generation of a surge voltage due to the turning-off of the switching element is suppressed, when the temperature of the switching elements detected by the temperature detecting unit indicates no overheating of the switching elements.

8. The machine according to claim 7, wherein the switching unit has a diode connected with the switching element which is set in the on state by the overheating protecting unit in the overheating protecting operation and through which an electric current flows in a flow direction, and an electric current flows through the diode in the same flow direction when the switching element set in the on state by the overheating protecting unit in the overheating protecting operation is turned off at the specific timing.

9. The machine according to claim 1, wherein the switching unit has a plurality of rectifier modules corresponding to respective output terminals of the armature coil, each of the rectifier modules has one switching element of the upper arm, one switching element of the lower arm, the temperature detecting unit detecting a temperature of the rectifier module and the overheating protecting unit, and each of the overheating protecting units performs the overheating protecting operation for the corresponding rectifier module when detecting that the temperature of the rectifier module detected by the corresponding temperature detecting unit indicates overheating of the rectifier module.

10. The machine according to claim 9, wherein the overheating protecting units of the rectifier modules are connected with one another, and each of the overheating protecting units sends information, indicating that the overheating protecting unit is now performing the overheating protecting operation, to the other overheating protecting units and receives information, indicating that one of the other overheating protecting units is now performing the overheating protecting operation, from the one of the other overheating protecting units.

11. The machine according to claim 10, wherein the rectifier modules have respective communication circuits connected with one another so as to communicate with one another, the sending of the information and the reception of the information are performed through the communication circuits, and each of the overheating protecting units performs the overheating protecting operation in response to the reception of the information, indicating that one of the other rectifier modules is now performing the overheating protecting operation, from the one of the other rectifier modules through the communication circuits.

12. The machine according to claim 10, further comprising:
a connection line through which the rectifier modules are connected with one another,
wherein each of the rectifier modules has a connection line driving unit, which sets a voltage level of the connection line at a specific value when the rectifier module is now performing the overheating protecting operation, and a different phase monitoring unit which monitors the voltage level of the connection line, and detects in response to the voltage level of the connection line set at the specific value that one of the other rectifier modules is now performing the overheating protecting operation, and
wherein the overheating protecting unit in each of the rectifier modules performs the overheating protecting operation when the corresponding different phase monitoring unit detects that one of the other rectifier modules is now performing the overheating protecting operation.

13. The machine according to claim 9, wherein the rectifier modules are fixed to a common heat dissipating member.

* * * * *